United States Patent
Shen et al.

(10) Patent No.: US 12,530,880 B2
(45) Date of Patent: Jan. 20, 2026

(54) TRAINING SYSTEM AND METHOD, TESTING SYSTEM AND METHOD, DATA FILTERING SYSTEM AND METHOD, AND COMPUTER READABLE RECORDING MEDIUM WITH STORED PROGRAM

(71) Applicant: Wistron Corporation, New Taipei (TW)

(72) Inventors: Tsai-Sheng Shen, New Taipei (TW); Yu-Yu Shih, New Taipei (TW); Kuang-Yu Wang, New Taipei (TW)

(73) Assignee: WISTRON CORPORATION, New Taipei (TW)

(*) Notice: Subject to any disclaimer, the term of this patent is extended or adjusted under 35 U.S.C. 154(b) by 286 days.

(21) Appl. No.: 18/515,515

(22) Filed: Nov. 21, 2023

(65) Prior Publication Data
US 2025/0054283 A1 Feb. 13, 2025

(30) Foreign Application Priority Data
Aug. 8, 2023 (TW) .................. 112129844

(51) Int. Cl.
G06V 10/776 (2022.01)
G06V 10/764 (2022.01)
G06V 10/771 (2022.01)

(52) U.S. Cl.
CPC .......... *G06V 10/776* (2022.01); *G06V 10/764* (2022.01); *G06V 10/771* (2022.01)

(58) Field of Classification Search
CPC ... G06V 10/776; G06V 10/771; G06V 10/764
See application file for complete search history.

(56) References Cited

FOREIGN PATENT DOCUMENTS

CN 109614883 A 4/2019
TW 202120917 A 6/2021

OTHER PUBLICATIONS

Yongkang He et al., "Data-Centric Diet: Effective Multi-center Dataset Pruning for Medical Image Segmentation", Aug. 2, 2023, arXiv:2308.01189v1, pp. 1-9 (Year: 2023).*
Examination report dated Jul. 5, 2024, listed in related Taiwan patent application No. 112129844.

* cited by examiner

*Primary Examiner* — David F Dunphy
(74) *Attorney, Agent, or Firm* — McClure, Qualey & Rodack, LLP

(57) ABSTRACT

The present invention provides a training system and method, a testing system and method, a data filtering system and method, and a computer readable recording medium with stored program that includes verifying whether an object detection model has completed a training set learning and determining whether the object detection model is overfitting with a validation set, and outputting the training model as a master model before the object detection model is overfitting, and how to iterate the master model to match the test set test results and continuously maintain an online test level. The present invention provides a standardized method for achieving data marking consistency and training data selection.

41 Claims, 27 Drawing Sheets

TRAINING SYSTEM AND METHOD, TESTING SYSTEM AND METHOD, DATA FILTERING SYSTEM AND METHOD, AND COMPUTER READABLE RECORDING MEDIUM WITH STORED PROGRAM

CROSS-REFERENCE TO RELATED APPLICATION

This non-provisional application claims priority under 35 U.S.C. § 119(a) to Patent Application No. 112129844 filed in Taiwan, R.O.C. on Aug. 8, 2023, the entire contents of which are hereby incorporated by reference.

BACKGROUND

Technical Field

The present invention relates to the technical field of neural network training methods, and in particular relates to the technical field of object detection model training methods.

Related Art

General users (especially those who only have domain knowledge but lack AI knowledge and skills) often face many problems when using Low Code/No Code artificial intelligence platform tools for on-site practical training and development of artificial intelligence models, especially complex detection problems such as defect detection. Whether the collected training picture content is sufficient cannot be determined, and there may be some images falling in a fuzzy judgment region in the picture, resulting in inaccurate model judgment. If it is expected to use an object detection model algorithm technology to achieve a better defect recognition capability, a standard object detection model may have a high demand for the quantity and quality of the training images. For quantity, the model may require a lot of training images. However, a marking method for object detection images is time-consuming, and it is usually difficult to collect defect images in factory production environments. For quality, due to the gradual nature of defects, it is difficult to achieve marking consistency, resulting in the incapability to improve the accuracy of the model. In addition, in order to improve the capability of the model, it is necessary to find parts that original data marking is not perfect, and it is also necessary to find out data similar to misjudgment images for training, thereby continuously iterating and optimizing the performance of the model. Users often need to cost a lot of effort and time, and also need to have a certain level of data analysis ability. Therefore, there is a need for a complete set of standard systematic execution processes, and even an application that can automatically execute this process.

SUMMARY

In view of this, some embodiments of the present invention provide a training system, a training method, a testing system, a testing method, a data filtering system, a data filtering method, and a computer readable recording medium with a stored program to solve the technical problems in the related art.

Some embodiments of the present invention provide a training system, including: at least one processing unit and an object detection model; the at least one processing unit is configured to execute the following steps: (a) before the object detection model finishes a training set learning, repeatedly executing the following steps: training the object detection model based on a training set with a current epoch number, wherein the training set includes multiple training images, each training image includes at least one marked outline, and a marked region formed by the at least one marked outline of each training image and a non-marked region are configured to train the object detection model; obtaining a first misjudgment set in the training set based on the trained object detection model and the training set; correcting the training set based on the first misjudgment set; and increasing the current epoch number; and (b) obtaining a misjudgment value of the object detection model and a second misjudgment set in a validation set based on the trained object detection model and each of multiple validation images in the validation set; correcting the validation set based on the second misjudgment set; and in response to the misjudgment value meeting a condition, increasing the current epoch number and executing steps (a)-(b), and in response to the misjudgment value not meeting the condition, outputting a previous training model as a master model.

Some embodiments of the present invention provide a training method which is suitable for training an object detection model and is executed by at least one processing unit. The training method includes: (a) before the object detection model finishes a training set learning, repeatedly executing the following steps: training the object detection model based on a training set with a current epoch number, wherein the training set includes multiple training images, each training image includes at least one marked outline, and a marked region formed by the at least one marked outline of each training image and a non-marked region are configured to train the object detection model; obtaining a first misjudgment set in the training set based on the trained object detection model and the training set; correcting the training set based on the first misjudgment set; and increasing the current epoch number; and (b) obtaining a misjudgment value of the object detection model and a second misjudgment set in a validation set based on the trained object detection model and each of multiple validation images in the validation set; correcting the validation set based on the second misjudgment set; and in response to the misjudgment value meeting a condition, increasing the current epoch number and executing steps (a)-(b), and in response to the misjudgment value not meeting the condition, outputting a previous training model as a master model.

Some embodiments of the present invention provide a testing system, including: at least one processing unit configured to execute the following steps: obtaining a test misjudgment value of a master model and a test misjudgment set in a test set based on the master model and the test set; outputting the master model as an off-line model in response to the misjudgment value meeting a test condition; and outputting the master model and the test misjudgment set in response to the test misjudgment value not meeting the test condition, wherein the test set includes multiple test images, and the test images include multiple first test images belonging to a first category and multiple second test images belonging to a second category, wherein an image belonging to the first category represents that the image is judged to include at least one defect image region belonging to one of multiple standard defect categories, and an image belonging to the second category represents that the image is judged to not include an image region belonging to one of the standard defect categories.

Some embodiments of the present invention provide a testing method, which is executed by at least one processing unit. The testing method includes the following steps: obtaining a test misjudgment value of a master model and a test misjudgment set in a test set based on the master model and the test set; outputting the master model as an off-line model in response to the misjudgment value meeting a test condition; and outputting the master model and the test misjudgment set in response to the test misjudgment value not meeting the test condition, wherein the test set includes multiple test images, and the test images include multiple first test images belonging to a first category and multiple second test images belonging to a second category, wherein an image belonging to the first category represents that the image is judged to include at least one defect image region belonging to one of multiple standard defect categories, and an image belonging to the second category represents that the image is judged to not include an image region belonging to one of the standard defect categories.

Some embodiments of the present invention provide a data filtering system, including: at least one processing unit configured to execute the following steps: receiving a master model, a data pool, a training set, and a test misjudgment set; selecting multiple test misjudgment images corresponding to at least one to-be-solved condition from the test misjudgment set; displaying the test misjudgment images, performing outline marking on each test misjudgment image based on a marking input, and performing a to-be-solved condition marking procedure on a plurality of marked areas of each test misjudgment image obtained during outline marking so as to enable the marked areas of each test misjudgment image to have a to-be-solved condition mark, wherein the to-be-solved condition mark corresponds to one of the at least one to-be-solved condition; training a filtering model based on the test misjudgment images until a filtering training of the filtering model is finished, wherein a structure of the filtering model is the same as that of the master model, and at least one detection category of the filtering model including the at least one to-be-solved condition; obtaining a misjudgment set in the training set based on the filtering model and the training set, and in response to the misjudgment set being non-empty, displaying and processing the misjudgment set based on a first input to obtain a processed training set; obtaining an acceptable data set in the data pool based on the filtering model and the data pool, and in response to the acceptable data set being non-empty, displaying and processing a currently displayed acceptable image based on a second input for each of at least one acceptable image in the acceptable data set; and integrating the training set processed and the acceptable data set as a new training set.

Some embodiments of the present invention provide a data filtering method, which is executed by at least one processing unit. The method includes: receiving a master model, a data pool, a training set, and a test misjudgment set; selecting multiple test misjudgment images corresponding to at least one to-be-solved condition from the test misjudgment set; displaying the test misjudgment images, performing outline marking on each test misjudgment image based on a marking input, and performing a to-be-solved condition marking procedure on multiple marked areas of each test misjudgment image obtained during outline marking so as to enable the marked areas of each test misjudgment image to have a to-be-solved condition mark, wherein the to-be-solved condition mark corresponds to one of the at least one to-be-solved condition; training a filtering model based on the test misjudgment images until a filtering training of the filtering model is finished, wherein a structure of the filtering model is the same as that of the master model, and at least one detection category of the filtering model including the at least one to-be-solved condition; obtaining a misjudgment set in the training set based on the filtering model and the training set, and in response to the misjudgment set being non-empty, displaying and processing the misjudgment set based on a first input to obtain a processed training set; obtaining an acceptable data set in the data pool based on the filtering model and the data pool, and in response to the acceptable data set being non-empty, displaying and processing a currently displayed acceptable image based on a second input for each of the at least one acceptable image in the acceptable data set; and integrating the training set processed and the acceptable data set as a new training set.

The present invention provides a computer readable recording medium with a stored program; and after at least one processor loads the program and executes the program, the training method, the testing method, the data filtering method and an online model training method can be performed by the computer readable recording medium with the stored program.

Based on the above, some embodiments of the present invention provide the training system, the training method, the testing system, the testing method, the data filtering system, the data filtering method, and the computer readable recording medium with the stored program. By correcting the training set, the domain knowledge could be sustainably integrated to improve the quality of the training set. By continuously judging whether the object detection model finishes the training set learning or not, it can be ensured that the model passes the underfitting stage. In addition, by judging whether the object detection model is overfitting or not through the validation set, the object detection model in the optimal training state can be obtained to serve as the master model before the object detection model is overfitting. By searching for the acceptable data set, the training set can be automatically analyzed to find out misjudgment reasons in the test set. It also utilizes the program algorithm process with domain knowledge to automate the correction of existing training set marking problems and the introduction of missing new data to obtain the data set for the next training.

DETAILED DESCRIPTION

Figure 1:
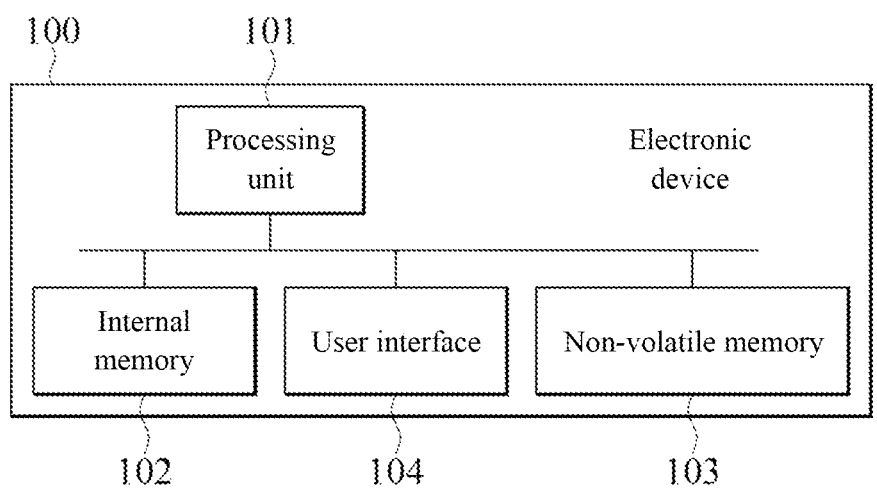
FIG. 1 is an electronic device block diagram according to an embodiment of the present invention.

The aforementioned and other technical content, features, and functions of the present invention will be clearly presented in the detailed description of the embodiments in conjunction with the accompanying drawings below. The thickness or size of each component in the drawings will be expressed in an exaggerated, omitted, or approximate manner for those skilled in the art to understand and read, and the size of each component is not entirely its actual size, and is not used for limiting the limitations that can be implemented in the present invention. Therefore, it does not have any technical substantive significance. Any structural modification, change in proportion relationship, or adjustment of size still fall within the scope of the technical content disclosed in the present invention without affecting the efficacy and purpose that the present invention can achieve. The same reference numerals in all drawings will be used for representing the same or similar components.

FIG. 1 is an electronic device block diagram according to an embodiment of the present invention. Referring to FIG. 1, an electronic device 100 includes a processing unit 101, an internal memory 102, a non-volatile memory 103, and a user interface 104. The internal memory 102 and the non-volatile memory 103 are configured to store programs; the programs may include program codes; and the program codes include computer operation instructions. The internal memory 102 and the non-volatile memory 103 provide the instructions and data for the processing unit 101. The processing unit 101 reads the corresponding computer programs from the non-volatile memory 103 into the internal memory 102 and then runs the programs. The processing unit 101 may include a single processor and may also include multiple processors of different types. The user interface 104 is configured to display images or information to be presented to a user by the processing unit 101 and receive signals generated by operation of the user.

In some embodiments of the present invention, the training system implements the electronic device 100 shown as FIG. 1. The non-volatile memory 103 stores an object detection model (for example, an Instance Segmentation model) to be trained. The object detection model includes multiple parameters. The multiple parameters of the object detection model may be randomly set values, or values obtained by the object detection model through some training procedures at the beginning.

The object detection model after being trained may receive an image, and output the categories of all objects in the image and mark the positions of the objects. In some embodiments of the present invention, the object detection model is an Instance Segmentation Model. The Instance Segmentation Model will classify the objects in the image into different categories at the pixel level. The Instance Segmentation Model is, for example, DeepMask, SharpMask, InstanceFCN, FCIS, Mask R-CNN, Mask Scoring R-CNN, and YOLACT, and is not limited in the present invention. In some embodiments of the present invention, the object detection model is a YOLO Model. Certainly, the object detection model may be other models which can output the categories of all objects in the image and mark the positions of the objects after being trained, and it is not limited in the present invention. The object detection model is the Instance Segmentation Model for description in the following.

In some embodiments of the present invention, the training system includes a neural network module, and the neural network module stores the object detection model. In some embodiments, the neural network module is a Neural-Network Processing Unit (NPU), and the NPU is connected with the processing unit 101, the internal memory 102, the non-volatile memory 103, and the user interface 104 in the electronic device 100.

The training method according to some embodiments of the present invention and cooperative operation of the modules of the electronic device 100 are described in detail below in cooperation with accompanying drawings.

Figure 20:
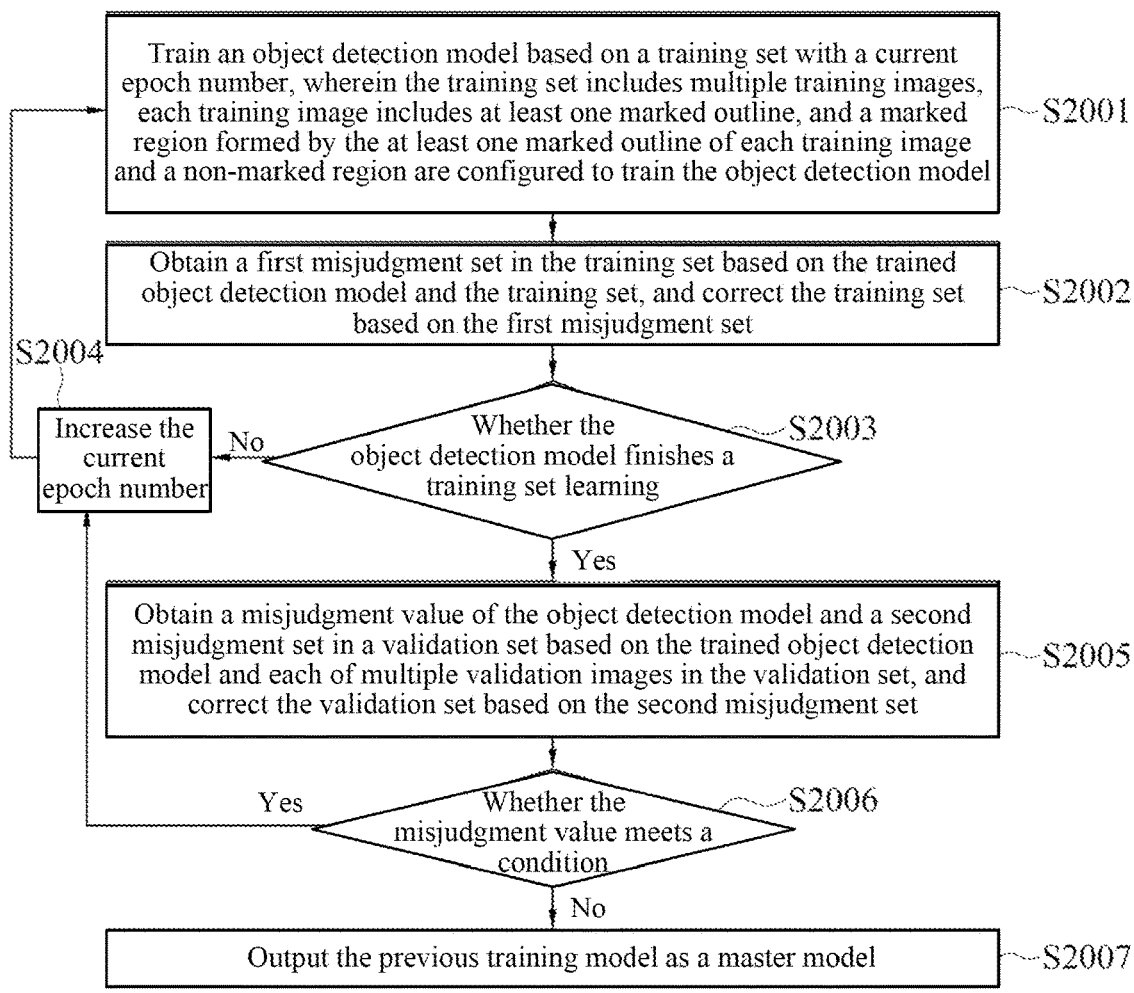
FIG. 20 is a training method flowchart according to an embodiment of the present invention.

FIG. 20 is a training method flowchart according to an embodiment of the present invention. In this embodiment shown as FIG. 20, the training method includes: executing step S2001 to step S2007 by the processing unit 101. In step S2001, the processing unit 101 trains the object detection model based on the training set with a current epoch number. The current epoch number refers to the number of the current training epoch. One training epoch indicates that all data in the training set are used for training the neural network once. The training set includes multiple training images; each training image includes at least one defect image region belonging to one of a plurality of defect categories, and the defect image regions are marked with an outline; a marked area formed by the outline of each defect image region includes the defect image region; and the unmarked area is free of defects. The purpose of training the object detection model is to enable the trained object detection model to identify image regions belonging to the defect category and non-defect parts from input image, and the image regions identified to belong to the defect category are marked by one outline so that the marked area formed by each outline includes respective defect image regions, and not to incorrectly identify unmarked areas which are not selected by the outline cannot. It is to be noted that in an embodiment of the present invention, when the outline is marked for the defect image region, a closed outline line is drawn by a line. In this case, the closed outline line is the outline of the defect image region, and the area enclosed by the closed outline line is the marked area formed by the outline. In some embodiments of the present invention, when the outline is marked for the defect image region, the region is used (for example, the defect image region is covered with a color block on the user interface 104) for covering an area including the defect image region. In this case, the edge of the area including the defect image region covered by the region is the outline of the defect image region, and the area including the defect image region covered by the region is the marked area formed by the outline. It is to be noted that all methods capable of clearly marking the range of the defect image region can be suitable for the present invention, and the present invention is not limited to the above two embodiments.

In step S2002, the processing unit 101 obtains a first misjudgment set in the training set based on the trained object detection model and the training set. That is, the processing unit 101 inputs all data in the training set into the object detection model for identification, calculates the number of misjudgment, and sets training images misjudged by the object detection model in the training set as the first misjudgment set.

The processing unit 101 processes the first misjudgment set. In some embodiments of the present invention, the processing unit 101 processes the first misjudgment set based on the following steps: the processing unit 101 judges whether the first misjudgment set is non-empty, and if the first misjudgment set is non-empty, that is, the first misjudgment set is not an empty set, the processing unit 101 will display all misjudgment training images in the first misjudgment set and modify the first misjudgment set based on the received first input. Since the first misjudgment set is in the training set, and if the first misjudgment set is corrected based on the first input, it is equivalent to that the training set is corrected. That is, the processing unit 101 modifies the training set based on the first misjudgment set.

In step S2003, the processing unit 101 judges whether the object detection model finishes the training set learning based on the trained object detection model and the training set, and executes step S2005 in response to the object detection model finishing the training set learning; and in response to the object detection model not finishing the training set learning, step S2004 is executed first to increase the current epoch number, and then step S2001 is executed to continue the training. It is to be noted that if the first misjudgment set is corrected based on the first input in the previous step, and step S2001 is repeated to continue the training, the object detection model is retrained with the corrected training set. In addition, it is to be noted that in step S2004, the current epoch number may be increased by adding a preset value to the current epoch number to serve as a new current epoch number, or adding other values to the current value according to other situations to serve as the new current epoch number.

In step S2005, the processing unit 101 obtains the misjudgment value of the object detection model and a second misjudgment set in the validation set based on the trained object detection model and each of the multiple validation images in the validation set, wherein the misjudgment value is used for evaluating whether to retrain the object detection model. That is, in this step, the trained object detection model is verified by the image validation set of each of the multiple validation images in the validation set so as to obtain the second misjudgment set of the misjudgment of the object detection model. The processing unit 101 processes the second misjudgment set. In some embodiments of the present invention, the processing unit 101 corrects the second misjudgment set based on the following steps: if the second misjudgment set is non-empty, the processing unit 101 will display the second misjudgment set and process the second misjudgment set based on the received second input. In step S2006, it is judged whether the misjudgment value meets a condition. In response to the misjudgment value meeting the condition, a current object detection model is stored as a "previous training model" (the "previous" refers to the previous time relative to the next time) and a current misjudgment value; step S2004 is executed first to increase the current epoch number; and then step S2001 is repeated to continue the training. In response to the misjudgment value not meeting the condition, step S2007 is executed, and the previous training model is outputted as the master model in step S2007.

It is to be noted that the second misjudgment set is in the validation set, so if the second misjudgment set is corrected based on the second input, it is equivalent to that the validation set is corrected. That is, the processing unit 101 corrects the validation set based on the second misjudgment set. After step S2001 is repeated to continue the training, and S2005 is executed, the processing unit 101 verifies the trained object detection model with the corrected validation set.

In some embodiments of the present invention, the above-mentioned condition is that the misjudgment value is less than or equal to the previous misjudgment value. Under a condition that the misjudgment value is less than or equal to the previous misjudgment value, it is indicated that training the object detection model with the training set again can result in an object detection model with smaller misjudgment value. If the current misjudgment value is greater than the previous misjudgment value, the stored previous object detection model will be outputted.

In some embodiments of the present invention, the above-mentioned condition is: the misjudgment value is not equal to zero and the current misjudgment value is smaller than or equal to the previous misjudgment value. If the processing unit 101 actually judges whether the misjudgment value meets the condition or not, the processing unit 101 may judge whether the misjudgment value meets the condition or not according to the following judgment logic: the processing unit 101 firstly judges whether the misjudgment value is equal to zero or not; in response to the misjudgment value being not equal to zero, the processing unit 101 continues to judge whether the misjudgment value is smaller than or equal to the previous misjudgment value or not; in response to the misjudgment value being smaller than or equal to the previous misjudgment value, the processing unit judges that the misjudgment value meets the condition; and in response to that the misjudgment value is equal to zero, the processing unit directly judges that the misjudgment value does not meet the condition (because zero is the minimum value). That is, when the misjudgment value is not equal to zero, whether to continuously train the model or not is determined according to the fact whether the misjudgment value is increased or not; and if the misjudgment value is equal to zero, training will be directly stopped, the current model will be outputted, instead of training until the misjudgment value increase to take the previous model, thus reducing the unnecessary model training time.

In the above embodiment, by processing and correcting the training set through the first input, the domain knowledge of an executor can be sustainably integrated to improve the quality of the training set. By continuously judging whether the object detection model finishes the training set learning, the model is ensured to pass the underfitting stage. In addition, by judging whether the object detection model is overfitting through the validation set, the object detection model in an optimal training state can be obtained to serve as a master model before the object detection model is overfitting.

It is to be noted that the training system and the training method are suitable for various object detection application scenes, for example, training of an instance segmentation model used for medical image detection, or training of an instance segmentation model used for defect detection.

Figure 21:
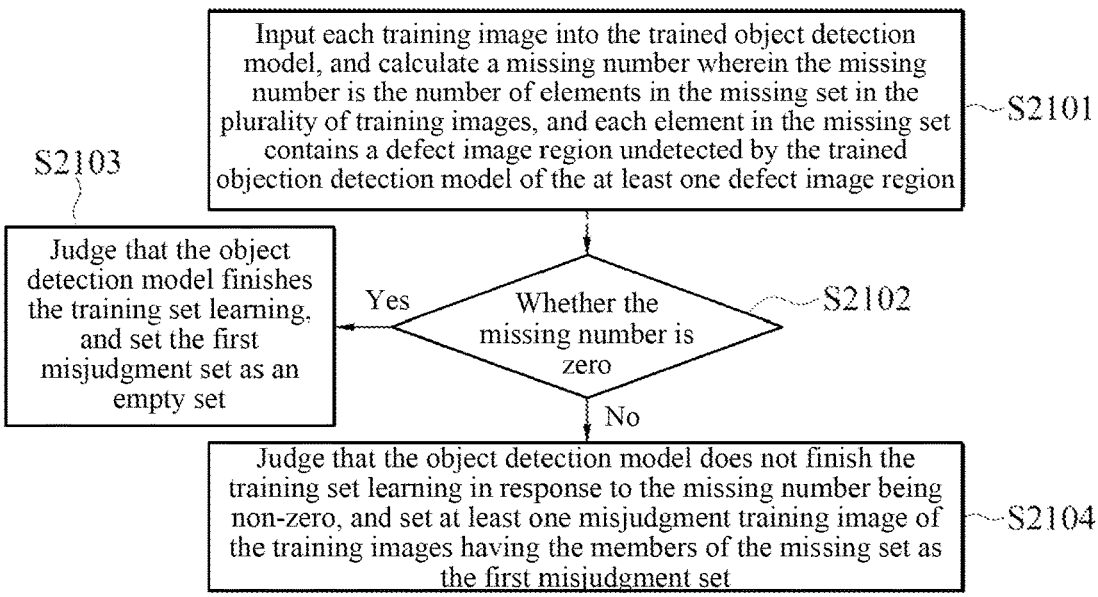
FIG. 21 is a training method flowchart according to an embodiment of the present invention.

The "whether to finish training set learning", "first misjudgment set", and "misjudgment" in the "first misjudgment set" in step S2003 have different definition ways according to different applications. FIG. 21 is a training method flowchart according to an embodiment of the present invention. Referring to FIG. 21, in this embodiment shown as FIG. 21, "misjudgment" is defined as that the trained object detection model misses at least one defect image region of the training image, that is, at least one defect image region of the training image is not detected by the trained object detection model. It is to be noted that since the trained object detection model will simultaneously output the defect category to which the detected defect image region belongs, the aforementioned situation where at least one defect image region of the training image is not detected by the trained object detection model comprises a situation where the wrong defect category is output. In this embodiment, step S2003 includes steps S2101-S2104. In step S2101, the processing unit 101 inputs each training image into the trained object detection model, and calculates a missing number wherein the missing number is the number of elements in the missing set in the plurality of training images, and each element in the missing set contains a defect image region undetected by the trained objection detection model of the at least one defect image region. In step S2102, the processing unit 101 judges whether the missing number is zero. In step S2103, the processing unit 101 judges that the object detection model finishes the training set learning in response to the missing number being zero, and sets the first misjudgment set as an empty set. In step S2104, the processing unit 101 judges that the object detection model does not finish the training set learning in response to the missing number being non-zero, and sets at least one misjudgment training image of the training images having the members of the missing set as the first misjudgment set.

It is to be noted that in some embodiments of the present invention, the defect categories include a standard defect category and a special defect category. The standard defect category refers to a category of "to-be-detected" image regions that the executor wishes a model to identify. The special defect category is used in a subsequently disclosed system and process (the standard defect category and the special defect category will be described in the following embodiments). In this embodiment, when the number of missing in the missing set without being detected by the trained object detection model in the at least one defect image region of all the training images is calculated, the calculation can be performed only for the standard defect category, and the special defect category is ignored.

In some embodiments of the present invention, that a defect image region is "detected" by the trained object detection model is defined as that an Intersection Over Union (IOU) of an outline outputted by the object detection model and the outline marked by the defect image region is greater than a preset IOU, and the confidence level of the object detection model outputting the defect image region is greater than a preset confidence level, then the defect image region is defined to be "detected" by the trained object detection model. Otherwise, the defect image region is defined to be "undetected". In some embodiments of the present invention, the preset IOU is 0.6, and the preset confidence level is 0.8.

Figure 22:
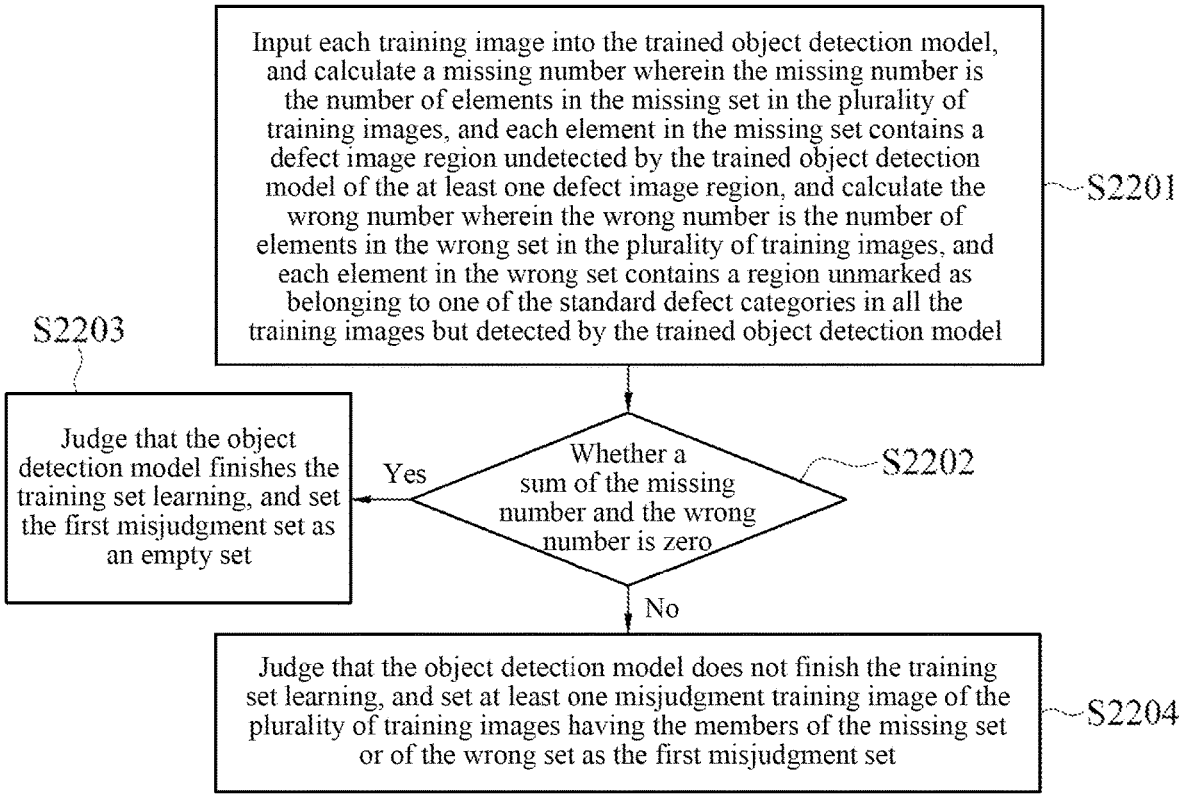
FIG. 22 is a training method flowchart according to an embodiment of the present invention.

FIG. 22 is a training method flowchart according to an embodiment of the present invention. Referring to FIG. 22, in this embodiment shown as FIG. 22, "misjudgment" is defined as that the trained object detection model misses and that a region in the training image without being marked as belonging to one of standard defect categories is detected by the trained object detection model. In this embodiment, step S2003 includes steps S2201-S2204. In step S2201, the processing unit 101 inputs each training image into the trained object detection model, and calculates a missing number wherein the missing number is the number of elements in the missing set in the plurality of training images, and each element in the missing set contains a defect image region undetected by the trained object detection model of the at least one defect image region, and calculates the wrong number wherein the wrong number is the number of elements in the wrong set in the plurality of training images, and each element in the wrong set contains a region unmarked as belonging to one of the standard defect categories in all the training images but detected by the trained object detection model. In step S2202, the processing unit 101 judges whether a sum of the missing number of and the wrong number is zero. In step S2203, the processing unit 101 judges that the object detection model finishes training set learning in response to the sum of the missing number and the wrong number being zero, and sets the first misjudgment set as an empty set. In step S2204, the object detection model is judged to not finish the training set learning in response to the sum of the missing number and the wrong number being non-zero, and sets at least one misjudgment training image of the plurality of training images having the members of the missing set or of the wrong set as the first misjudgment set.

It is to be noted that in the above embodiment, the object detection model is judged to finish the training set learning only when the missing number is zero or the sum of the missing number and the wrong number is zero. The above condition may be relaxed to make the missing number of be a preset small number or make the sum of the missing number and the wrong number be a preset small number, which is not limited in the present invention.

Figure 23:
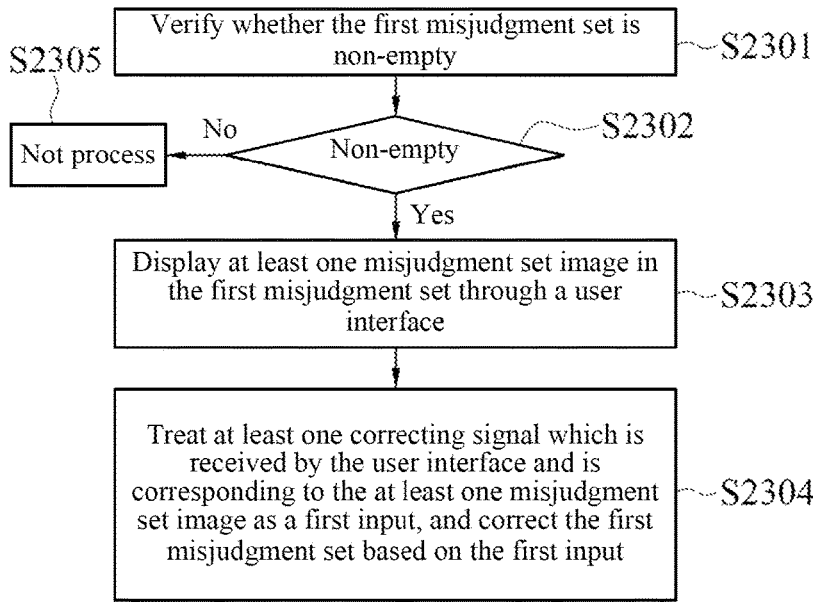
FIG. 23 is a training method flowchart according to an embodiment of the present invention.

FIG. 23 is a training method flowchart according to an embodiment of the present invention. In this embodiment shown as FIG. 23, step S2002 includes steps S2301-S2305 to process the first misjudgment set. In step S2301, the processing unit 101 verifies whether the first misjudgment set is non-empty. In step S2302, if the first misjudgment set is non-empty, the processing unit 101 executes step S2303; and if the first misjudgment set is not non-empty (i.e., empty set), step S2305 is performed. In step S2305, the processing unit 101 does not process the first misjudgment set. In step S2303, the processing unit 101 displays at least one misjudgment set image in the first misjudgment set through the user interface 104. For each misjudgment image, a correcting signal is received from the user interface 104, the correcting signal may be a signal skipping correcting, and the signal skipping correcting indicates that the displayed misjudgment image does not need to be corrected. The implementation of the correcting signal will be further disclosed in the subsequent embodiment. In step S2304, the processing unit 101 takes at least one correcting signal corresponding to the at least one misjudgment set image received by the user interface 104 as a first input, and corrects the first misjudgment set based on the first input. It is to be noted that in step S2005, the processing unit 101 may also process the second misjudgment set by the steps shown as FIG. 23.

The following will describe the preparation process of the abovementioned training set and validation set in some embodiments with the accompanying drawings.

Figure 2:
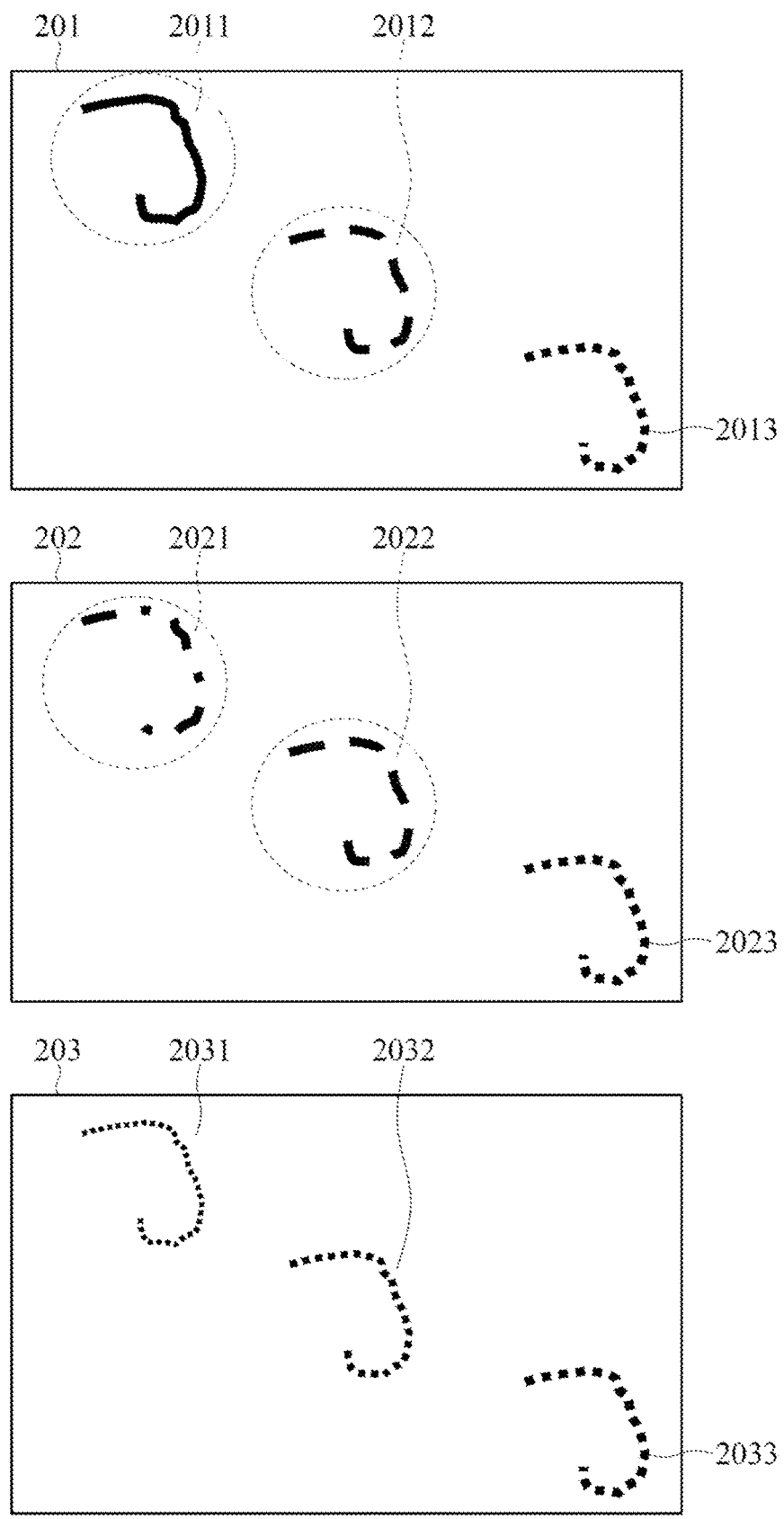
FIG. 2 is a schematic image category classification diagram according to an embodiment of the present invention.

FIG. 2 is a schematic image category classification diagram according to an embodiment of the present invention. Referring to FIG. 2, in this embodiment shown as FIG. 2, in some embodiments of the present invention, the executor collects all available image data (such as photos) as much as possible to serve as a data pool, the pattern distribution of data image regions in the data pool is arbitrary, but the data content in the data pool is enriched to the maximum. The data in the data pool serves as a data source of the training set and the validation set in the training system and the training method. It is to be noted that during the execution of the training system and the training method, if the executor collects new image data, the executor can also add the new image data into the data pool at any time. The executor obtains the test set by full inspection or sampling according to the data actually produced by a production line, and the pattern distribution of the data content of the test set is a data distribution pattern representing the actual production information of the current production line and serves as the data of the performance test of each generation of model in the following test process. In the test process, the data is fixed data. The test set and the data pool are two independent sets.

Three pieces of data, namely, "training set", "validation set", and "test set", will be prepared for general model training, which is the same as this embodiment. However, general model training is usually to randomly divide all collected data into these three pieces of data according to a certain proportion (such as 6:2:2), the concept of this processing is actually to train a model meeting "general standard" (the general degree is determined according to the collected data), but two pieces of data, namely, "data pool" and "test set" are defined at the beginning, the data meaning of the "data pool" is similar to "all collected data" in general model training, and the meaning of "test set" simulates the "data distribution pattern in real operation of the production line". Therefore, the data of the "training set" and the data of the "validation set" are both from the data pool, and the purpose is to train a model meeting "approximate general standard". Then the model will be adjusted and calibrated through the data of the "test set" in order to correct the model to be "suitable for real data distribution of the production line" on a premise that the "approximate general standard" is achieved. Therefore, the generalization capability of the model meeting "general standard" can be kept, and the model can be corrected to achieve "specific data distribution pattern", so that the purpose of applying in the production line is quickly achieved.

The images collected by the executor may include background information and traces, and the traces are called image regions of the images, for example, as shown in FIG. 2, image regions 2011, 2012 and 2013 of an image 201, image regions 2021, 2022 and 2023 of an image 202, and image regions 2031, 2032 and 2033 of an image 203. The image regions of the images are able to be distinguished into three types, namely, "to-be-detected", "undetected" and "uncertain to-be-detected" by the executor according to the "degree" of presentation. The executor hopes that the model can identify which categories of "to-be-detected" image regions are called standard defect categories, the standard defect categories are defined by the executor, and the category number, names, presentation differences between the categories, and the like are defined by a user as required (the standard defect categories will be further described later). Then the executor divides all photos into three data categories, namely, a first category, a second category, and a third category, according to the judgment standard. The image in the first category is judged to include an image region belonging to one of multiple standard defect categories, and the image region belonging to one of the multiple standard defect categories is called a defect image region. For example, the image region 2011 of the image 201 (presented in a solid line in this figure, and it is to be noted that the solid line is presented only for description, and is not used for limiting the actual presentation mode of the defect image region in the present invention) is a defect image region. The image in the second category is determined to not include an image region belonging to one of the standard defect categories, also not include an image region which is unable to be judged whether to belong to one of the defect categories (i.e., the image region which is "uncertain to-be-detected", it is referred to as an uncertain image region below), but include an acceptable image region (i.e., the image region which is "undetected"); the acceptable image region is also referred to as an real ok image region; and the second category can also be referred to as an real ok category. For example, the image region 2013 of the image 201, the image region 2023 of the image 202, and the image region 2031, the image region 2032, and the image region 2033 of the image 203 are real ok image regions (presented in a dotted line in the figure, and it is to be noted that the dotted line is presented only for description, and is not used for limiting the actual presentation mode of the acceptable image region in the present invention). The third category does not include an image region belonging to one of the multiple standard defect categories but includes an image region which is unable to be judged whether to belong to one of the defect categories. For example, the image region 2012 of the image 201, and the image region 2021 and the image region 2022 of the image 202 are uncertain image regions (represented in a strip-shaped dotted line in this figure, and it is to be noted that the strip-shaped dotted line is only used for description, and is not used for limiting the actual presentation mode of the uncertain image regions). In an embodiment, one image may not include any image region of the abovementioned image. In this case, the image regions certainly belong to the second category (real ok category). In other embodiments, the image region of the first category and the image region of the second category are marked firstly, and the remaining unmarked image regions belong to the image region of the third category. During actual operation, a label will be added to the image so that the processing unit 101 can distinguish whether the image belongs to the first category, the second category or the third category.

Since the image 201 is judged to include the image region 2011 belonging to one of the multiple standard defect categories, the image 201 belongs to the first category. Since the image 203 is judged to not include the image region belonging to one of the standard defect categories and not include the uncertain image region, the image 203 belongs to the second category. Since the image 202 does not include an image region belonging to one of the multiple standard defect categories but includes image regions (image region 2021 and image region 2022) which are not able be judged whether to belong to one of the defect categories, the image 202 belongs to the third category. A set of images belonging to the first category in the data pool is called a first category set, a set of images belonging to the second category in the data pool is called a second category set, and a set of images belonging to the third category in the data pool is called a third category set. For facilitating description, the images in the first category set are called first images, and the images in the second category set are called second images. In the test set, all data is divided into the first images, the second images, and the third images according to this concept, but in this embodiment, only the first images and the second images are taken for test and misjudgment analysis when a model test is actually performed.

In some embodiments of the present invention, the standard defect categories are "to-be-detected" defect categories defined by the user, such as a foreign matter category, a scratch category, and other standard defect categories defined by the user. However, based on the process operation requirements, special defect categories are additionally defined, namely an uncertain defect category and non-category. The special defect category is used in the system and process which are subsequently disclosed, and the special defect category will be further described in the later embodiment.

It is to be noted that in the abovementioned embodiment, that the "to-be-detected" defect category includes the foreign matter category and the scratch category is only a possible implementation, the standard defect categories defined by the user may be multiple different categories, the number is not limited, and multiple standard defect categories are able to be defined by the user as required.

It is to be noted that the defect image region/real ok image region represents that a marking person may correctly classify the data of the first category/second category according to a current judgment standard, and the uncertain image region represents that the executor is hard to correctly classify the data of the first category/second category according to the current judgment standard (such as a shallow image region trace). Therefore, the training method will focus on object detection model training and validation on the real ok image region/defect image region data, so as to avoid the problem that "inconsistent judgment standards" influences the data marking quality, resulting in the limitation to the continuous optimization process of the object detection model. For the data of the uncertain image region, if the executor finds out a new judgment standard in the future, the consistency of the judgment to the current uncertain image region may be ensured, so that the data can be moved into the real ok image region/defect image region from the uncertain image region, and the object detection model training and validation are executed again.

This embodiment is to describe the way to select the initial training set and the validation set from the data pool. The executor judges possible presentation patterns for each standard defect category (the foreign matter category and the scratch category) according to owned domain knowledge, then defines the defect presentation patterns under each standard defect category (for example, the foreign matter category includes presentation patterns such as point-shaped foreign matter and flock-shaped foreign matter, and the scratch category includes presentation patterns such as point-shaped stabs and linear sliding marks), and finally selects photos of each defect pattern with the same number from the first category set of the data pool according to the concept of average distribution (for example, 10 photos of each defect pattern such as point-shaped foreign matter, flock-shaped foreign matter, point-shaped stabs and linear sliding marks) to form the training set.

Figure 3:
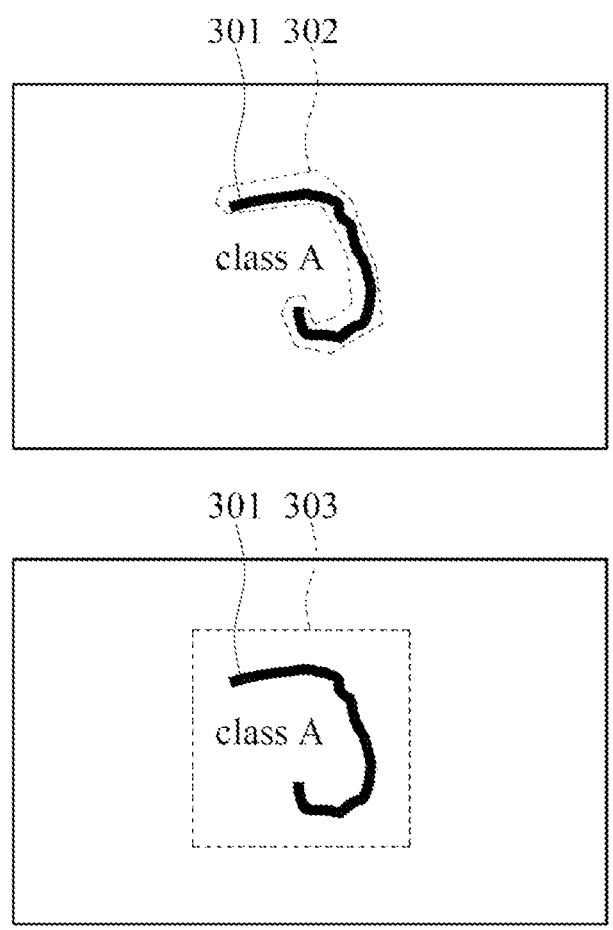
FIG. 3 is a schematic outline marking diagram according to an embodiment of the present invention.

Then the executor performs outline marking on images selected from the first category set of the data pool as the training set. FIG. 3 is a schematic outline marking diagram according to an embodiment of the present invention. Referring to FIG. 3, the executor performs different outline marking on the images selected from the first category set of the data pool as the training set according to the category of the object detection model. For example, when the object detection model is the instance segmentation model, the outline 302 is marked on the image region 301 shown as FIG. 3. When the object detection model is the YOLO model, an outline 303 is marked on the image region 301 shown as FIG. 3. The outline marking mode is determined according to the category of the object detection model, which is not limited in the present invention. The defect category to which the image region belongs is specified while outline marking is performed, for example, if the image region 301 is classified into the foreign matter category, the image region 301 will be specified as belonging to the foreign matter category while outline marking is performed for subsequent training of the object detection model. As shown in FIG. 3, the image region 301 is marked as class A, and class A represents the foreign matter category. It is to be noted that although "class A" shown as FIG. 3 is beside the image region 301, FIG. 3 is only used for description. Actually, the processing unit 101 will store the category of the image region 301 in an appropriate data structure and display class A or other identifiable symbols on the user interface at appropriate time so as to represent that the category of the image region 301 is the foreign matter category. As the images of the training set may have multiple marked outlines, the area in each marked outline will be used for training the object detection model.

The validation set is formed by respectively taking a proper number (such as 100) of images from the first category set and the second category set of the data pool in a random manner.

Finally, the training set may include multiple training images. The validation set includes multiple validation images. The training images are selected from the first category set in the data pool. The validation images are selected from the first category set in the data pool and the second category set in the data pool. The first category set includes multiple first images. The second category set includes multiple second images. At least one defect image region of the training images is marked with an outline (it is to be noted that the executor firstly selects the training images from the first category set of the data pool and then performs outline marking on the training images, so the unselected images of the first category set in the data pool are out of outline marking). During validation in step S2005 shown as FIG. 20, a label of the image itself which can be used to identify whether the image belong to the first category or the second category can be used to verify the object detection model, so that the outline marking is only performed on the training set, rather than the validation set.

When training the object detection model, it is needed to initialize an object detection model structure first, which will define "how many kinds" of defect detection capabilities the object detection model has. At the beginning, the training set only includes standard defect categories such as the foreign matter category and the scratch category, the definition of special defect category (uncertain defect category and non-category) can be added, and the capability of the object detection model to lean the two special defect categories in the future is added. When the executor uses a marking element (which can be realized by software or hardware) to execute outline marking, it is needed to define the "defect category names" which all executors want to detect at the same time (namely, the capability of the model for detecting the number of defect categories is defined at the same time). In this embodiment, in addition to the defect category defined by the executor, two special categories will be automatically "preset and defined", that is, the two above-mentioned special defect categories: uncertain defect category and non-category, in order to be used in the subsequently disclosed system and process. The meaning of the uncertain defect category refers to that the trained object detection model detects a defect image region but the executor recognizes as an image region of the uncertain image region according to the judgment standard. The training image in one training set may include multiple image regions marked as defect image regions and multiple image regions marked as uncertain image regions at the same time. When one image region of the training image is detected as the defect image region by the trained object detection model, but the image region is recognized as an image region of the uncertain image region by the executor, the image region will be specified as the uncertain defect category which is a special category.

Based on the above definition, it is to be noted that the uncertain defect category is a category of "passive marking". That is, at the beginning, the executor does not actively mark a part that is defined as an uncertain image region, but in the training process of the object detection model, the object detection model detects that the place belongs to a certain "standard defect category", but the executor re-judges and does not define that the part belongs to a certain "standard defect category" to be detected, and the executor is unable to determine the part to be an image region of a negligible "undetected" image, so the detection area of the object detection model is corrected into a special defect category mark of the "uncertain defect category".

In some embodiments of the present invention, the object detection model structure only includes the standard defect category.

Figure 4:
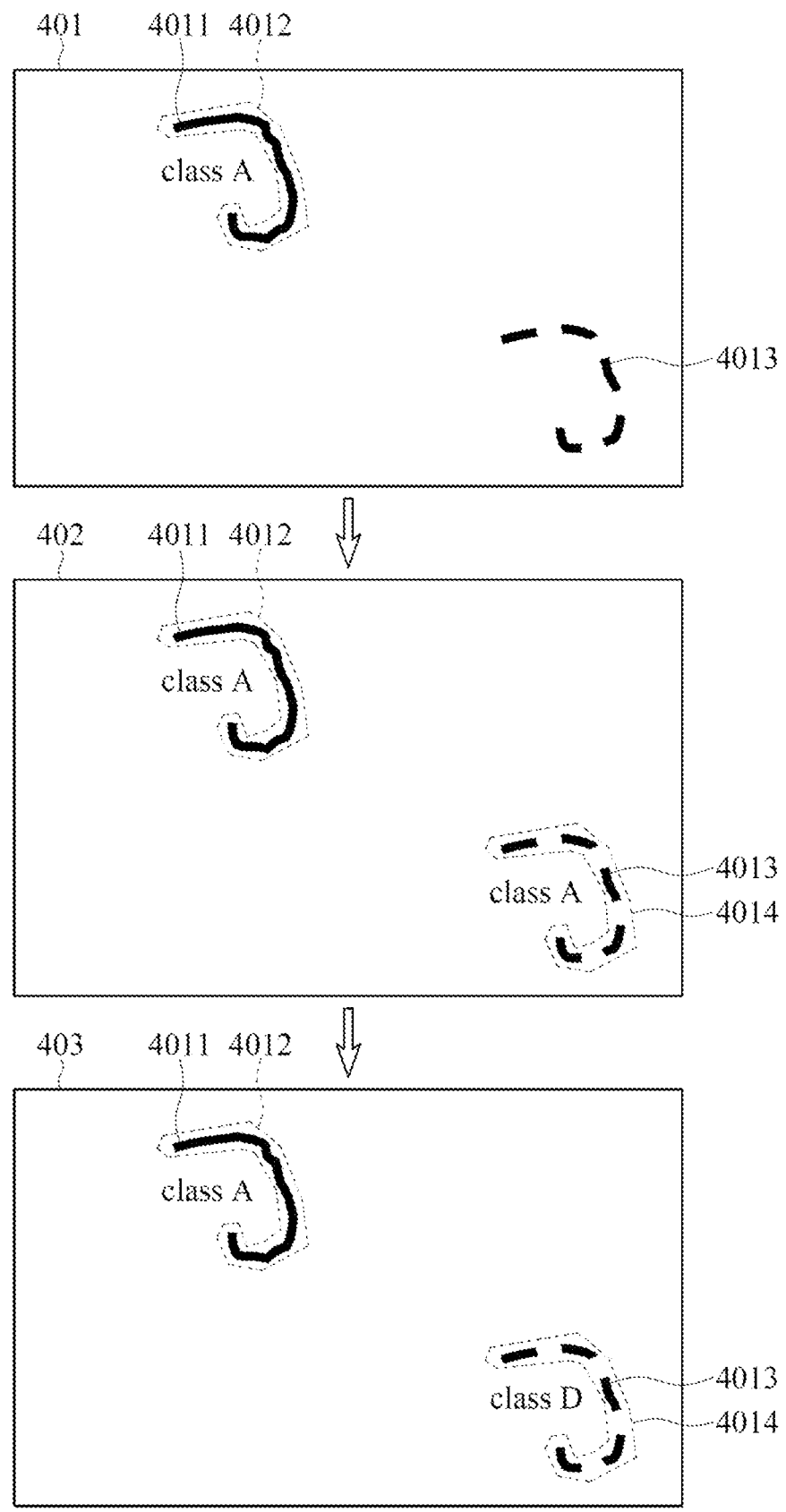
FIG. 4 is a schematic uncertain defect category diagram according to an embodiment of the present invention.

FIG. 4 is a schematic uncertain defect category diagram according to an embodiment of the present invention. Referring to FIG. 4, an image region 4011 in an image 401 is defined as a defect image region belonging to the foreign matter category at the beginning (so the image region is marked with an outline 4012 and marked as class A); and an image region 4013 in the image 401 is not defined as an "to-be-detected" image region (not marked) (during general operation, the executor may relatively easily judge whether the defect belongs to "to-be-detected" or "undetected", but may not easily judge whether the defect is "uncertain to-be-detected". Therefore, the executor is generally not required to judge whether the defect is "uncertain to-be-detected", but when the executor is unable to judge whether the defect is "to-be-detected" or "undetected", the defect will be classified as "uncertain to-be-detected"). However, the trained object detection model defines that the image region 4013 is the defect image region belonging to the foreign matter category, and the image region is marked with an outline and marked as class A to be displayed through the user interface 104 (shown as an image 402). The executor re-judges that the image region 4013 is an uncertain image region, then the processing unit 101 will designate the image region 4013 as belonging to the uncertain defect category based on the input of the executor (so the image region is marked with an outline 4014 and marked as class D), and the processing unit 101 stores the modified image 401 (shown as an image 403) (the mark representing that the image region 4013 belongs to class D in the uncertain defect category is added). It is to be noted that the outline 4014 of the image region 4013 is also stored together. As described above, the images 401-403 are the same image, but the marks representing the image regions are actually modified, so the images are shown respectively as images 401-403. In the following, the same representation mode will be adopted for description.

Figure 5:
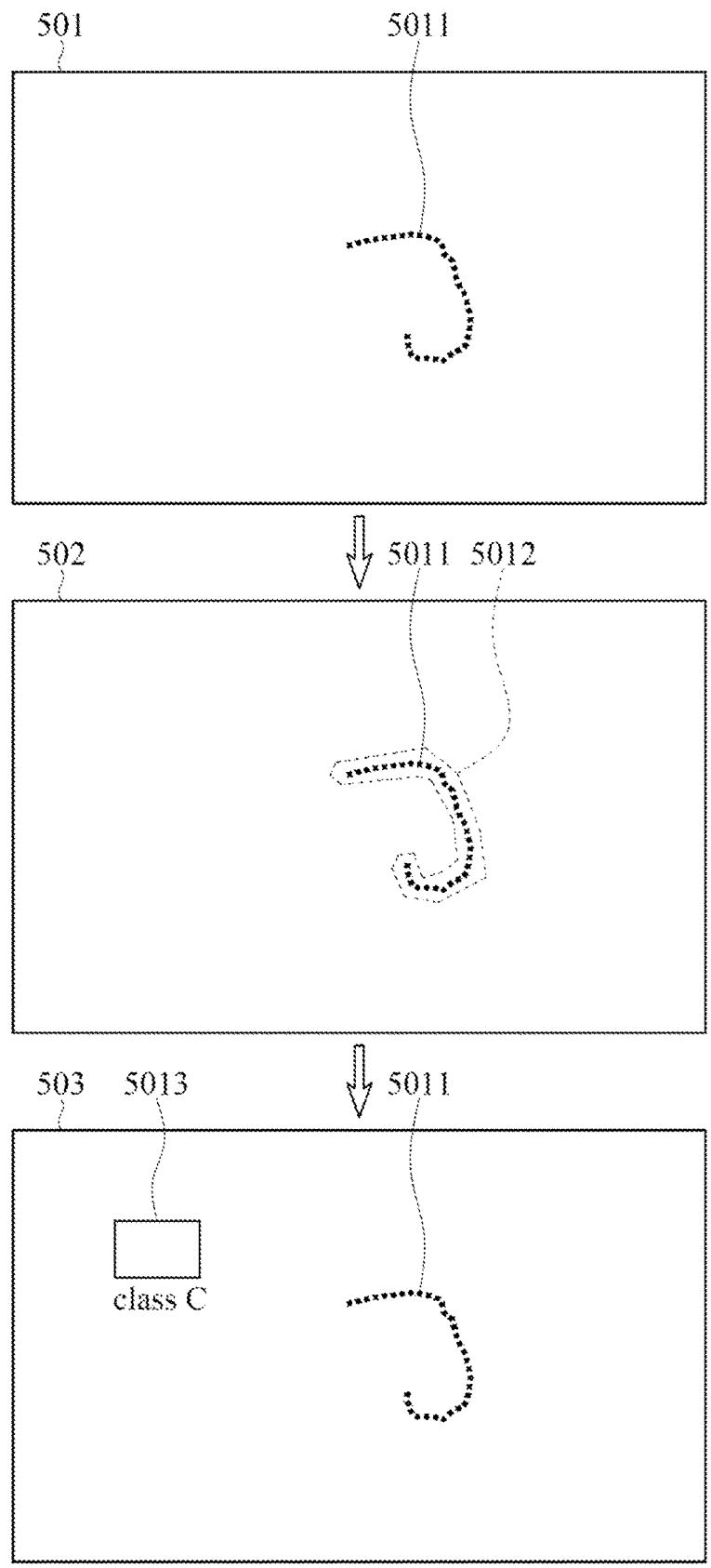
FIG. 5 is a schematic non-category diagram according to an embodiment of the present invention.

The non-category has multiple functions. FIG. 5 is a schematic non-category diagram according to an embodiment of the present invention. Referring to FIG. 5, an image region 5011 in an image 501 is defined as the real ok image region (thus no mark) which does not belong to the foreign matter category at the beginning. However, the trained object detection model defines that the image region 5011 is a defect image region belonging to the foreign matter category, and the defect image region is marked with an outline 5012 and displayed through the user interface 104 (shown as an image 502). The executor re-judges the image region 5011 to be the real ok image region, so the processing unit 101 will mark an outline 5013 to specify an area and specifies the region surrounded by the outline 5013 as belonging to non-category (marked as class C) based on the input of the executor. The processing unit 101 will delete the outline 5012 of the image region 5011. The processing unit 101 stores the modified image 501 (shown as an image 503). In order to avoid automatic ignoring of an image without being marked during model training, in this embodiment, a photo having a "that is a defect that need not be detected" feature needing to be learned by the object detection model will be forcibly added into the training set to be learned by the model according to the above method. Other functions of the above uncertain defect category and the non-category will be further described in the following embodiments.

FIG. 6 to FIG. 10 are schematic first misjudgment set processing diagrams according to an embodiment of the present invention. Referring to FIG. 6 to FIG. 10, FIG. 20, and FIG. 23, in this embodiment, when executing step S2303, the processing unit 101 will display all misjudgment set images in the first misjudgment set through the user interface 104. In some embodiments, the processing unit 101 will display an image 601 shown as FIG. 6 through the user interface 104, the image 601 includes an image region 6011 originally specified as belonging to the scratch category, and that the image region 6011 is marked with an outline 6012 and marked as class B indicates that the image region is specified as belonging to the scratch category. The trained object detection model defines that the image region 6011 belongs to the foreign matter category, and the executor re-judges and defines that the image region does not belong to the specified defect category, but belongs to the foreign matter category, so the executor will specify the category of the image region 6011 as the foreign matter category through the user interface 104. A signal generated by the executor operating the user interface 104 is the abovementioned correcting signal, and the processing unit 101 will correct the category of the image region 6011 as the foreign matter category with the correcting signal received by the user interface 104 (so the image region is re-marked as class A), and store the corrected image 601 (shown as an image 602).

Figure 7:
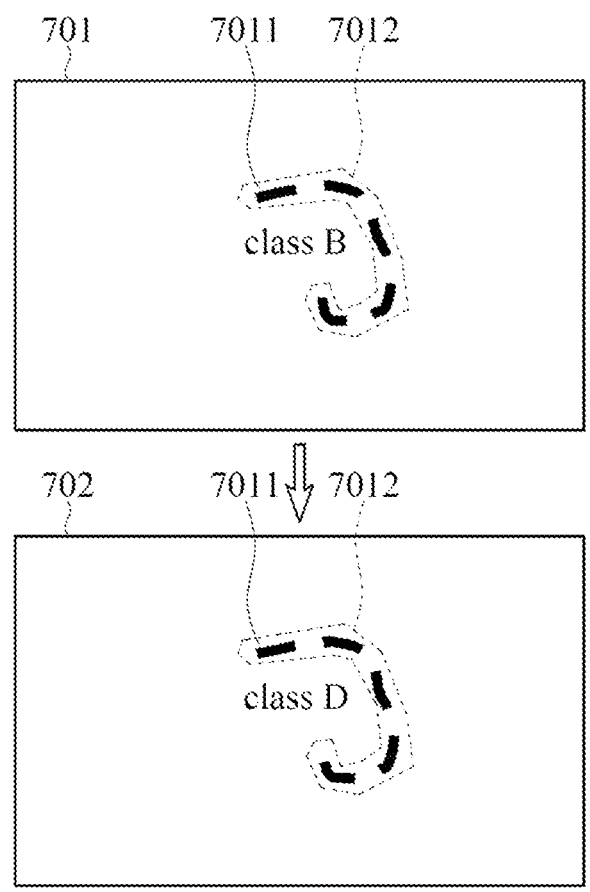
FIG. 7 is a schematic first misjudgment set processing diagram according to an embodiment of the present invention.

In some embodiments, the processing unit 101 will display an image 701 shown as FIG. 7 through the user interface 104. The image 701 includes an image region 7011 which is originally designated as belong to the scratch category. That the image region 7011 is marked with an outline 7012 and marked as class B indicates that the image region is designated as belonging to the scratch category. The trained object detection model defines that the image region 7011 belongs to the foreign matter category, and the executor re-judges and defines that it is an image region of the uncertain image region, so the executor will designate the category of the image region 7011 as the special category of uncertain defect category through the user interface 104. A signal generated by the executor operating the user interface 104 is the abovementioned correcting signal. The processing unit 101 will correct the category of the image region 7011 into the uncertain defect category with the correcting signal received by the user interface 104 (marked as class D), and store the corrected image 701 (shown as an image 702).

Figure 8:
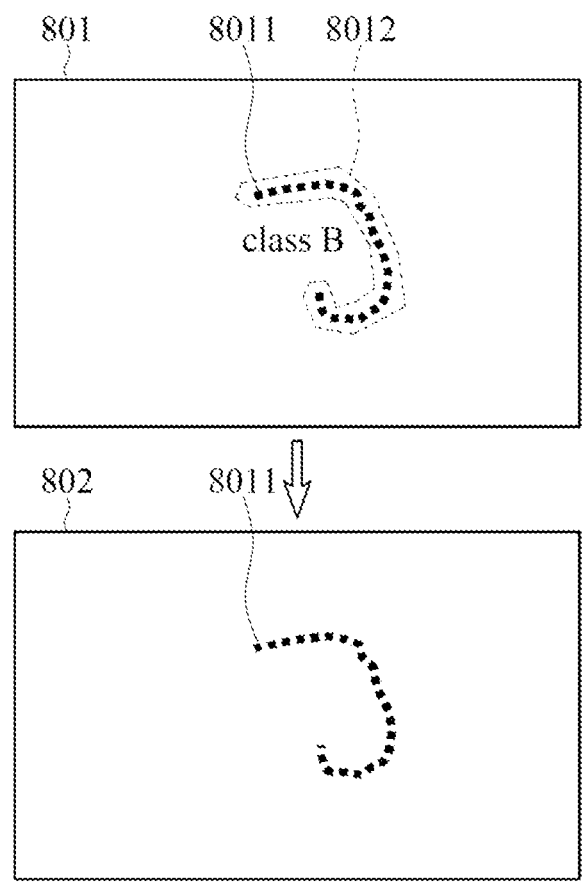
FIG. 8 is a schematic first misjudgment set processing diagram according to an embodiment of the present invention.

In some embodiments, the processing unit 101 displays an image 801 shown as FIG. 8 through the user interface 104. The image 801 includes an image region 8011 which is originally designated as belonging to the scratch category. That the image region 8011 is marked with an outline 8012 and marked as a class B indicates that the image region is designated as belonging to the scratch category. The trained object detection model defines that the image region 8011 belongs to the foreign matter category, and the executor re-judges and defines that it is a real ok image region, so the executor will remove the originally designated scratch category (class B) and the outline 8012 of the image region 7011 through the user interface 104. A signal generated by the executor operating the user interface 104 is the abovementioned correcting signal. The processing unit 101 will remove the originally designated scratch category (class B) and the outline 8012 of the image region 8011 with the correcting signal received by the user interface 104, and store the corrected image 801 (shown as an image 802).

Figure 6:
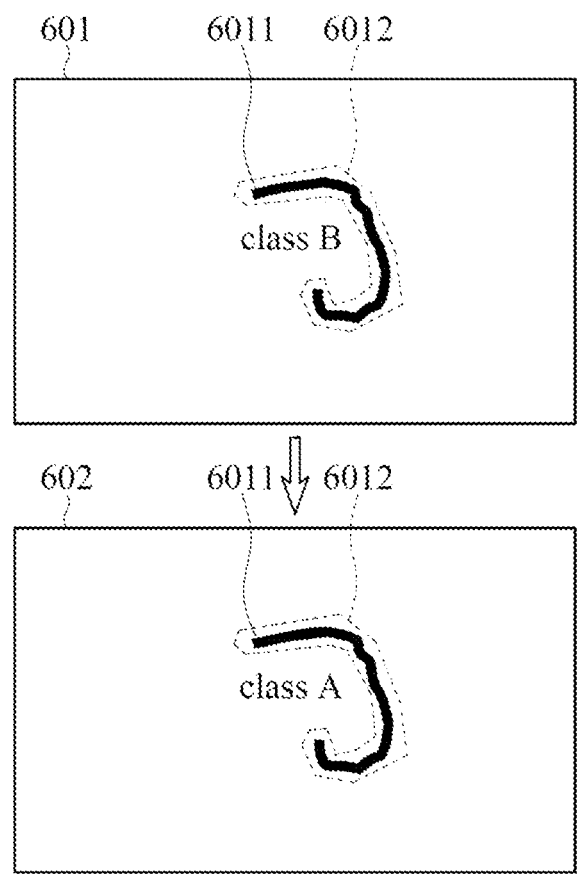
FIG. 6 is a schematic first misjudgment set processing diagram according to an embodiment of the present invention.

FIG. 6 to FIG. 8 refers to the schematic diagram of mark correction process corresponding to the situation that marks are originally made and detected (different detection categories) or not detected by the model, so marks are in the first misjudgment set, and the executor re-judges and defines to correct the original category marks (standard defect category, uncertain image region, real ok image region, etc.).

Figure 9:
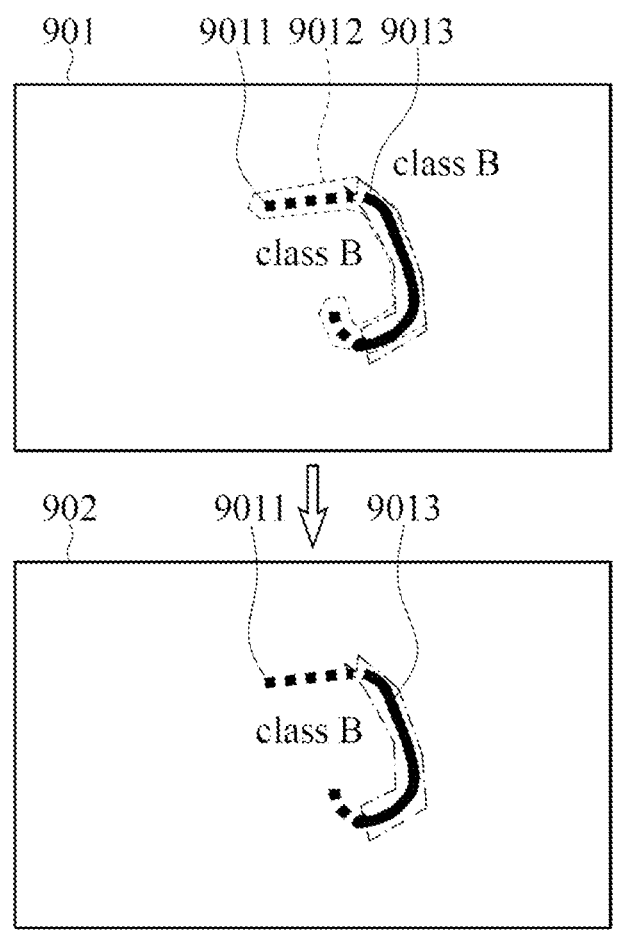
FIG. 9 is a schematic first misjudgment set processing diagram according to an embodiment of the present invention.

In some embodiments, the processing unit 101 displays an image 901 shown as FIG. 9 through the user interface 104, and the image 901 includes an image region 9011. The image region 9011 is originally designated as belonging to the scratch category (marked as class B) and has an outline 9012. The trained object detection model defines that the image region 9011 belongs to the scratch category but the outline is an outline 9013. The Intersection over Union of the outline 9012 and the outline 9013 is less than 0.5 (other values may be set as required), so the processing unit 101 displays through the user interface 104. The executor re-judges and defines that the outline of the image region 9011 is the outline 9013, so the executor changes the outline of the image region 9011 into the outline 9013 through the user interface 104. A signal generated by the executor operating the user interface 104 is the abovementioned correcting signal. The processing unit 101 will correct the outline of the image region 9011 with the correcting signal received by the user interface 104, and store the corrected image 901 (shown as an image 902).

Figure 10:
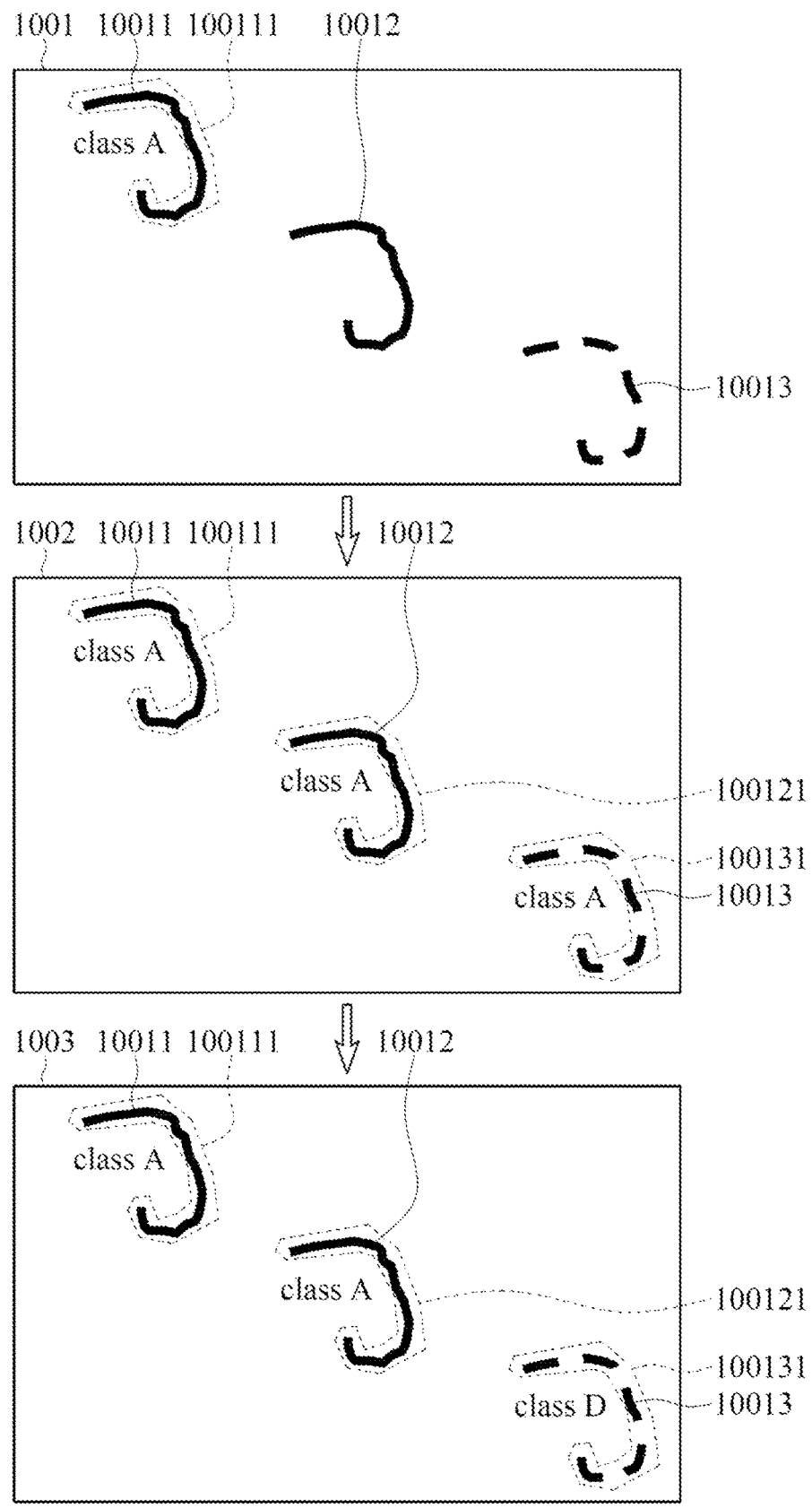
FIG. 10 is a schematic first misjudgment set processing diagram according to an embodiment of the present invention.

In some embodiments, according to an image 1001 shown as FIG. 10, the image 1001 includes an image region 10011, an image region 10012, and an image region 10013. The image region 10011 is originally determined as belonging to the foreign matter category (so the image region is marked with an outline 100111 and marked as class A). The image region 10012 and the image region 10013 are not identified as belonging to any one of defect categories, so they are not specified as belonging to any defect categories (thus no mark). The trained object detection model defines that the image region 10011 belongs to the foreign matter category. The trained object detection model defines that the image region 10012 belongs to the foreign matter category and the image region is marked with an outline 100121 and marked as class A by the trained object detection model. The trained object detection model defines that the image region 10013 belongs to the foreign matter category and the image region is marked with an outline 100131 and marked as class A by the trained object detection model. The identification result of the object detection model is displayed through the user interface 104 (shown as an image 1002). The executor re-judges and defines that the image region 10012 actually belongs to the foreign matter category, so the executor will specify the category of the image region 10012 as the foreign matter category by the user interface 104 and marks the outline 100121. The executor re-judges and defines that the image region 10013 is an image region of the uncertain image region, so the executor will specify the category of the image region 10013 as a special category of uncertain defect category (so the image region is marked as class D) by the user interface 104 and marks the outline 100131. A signal generated by the executor operating the user interface 104 is the abovementioned correcting signal. The processing unit 101 will correct the image 1002 with the correcting signal received by the user interface 104, and store the corrected image 1002 (shown as an image 1003).

FIG. 10 shows a condition that the mark is originally not provided, and is to be added later. An image region 10011 is marked for the original image (an image region 10012 and an image region 10013 may be missed during marking or are defined as belonging to the image regions of the uncertain image regions, so marking is not performed), but the object model detects two "misjudgment" parts of the image region 10012 and the image region 10013. The executor re-judges and judges that the image region 10012 belongs to the to-be-detected detect (so a standard category mark class A is added). The executor re-judges and judges that the image region 10013 is an uncertain image region (so a class D mark is added).

Figure 24:
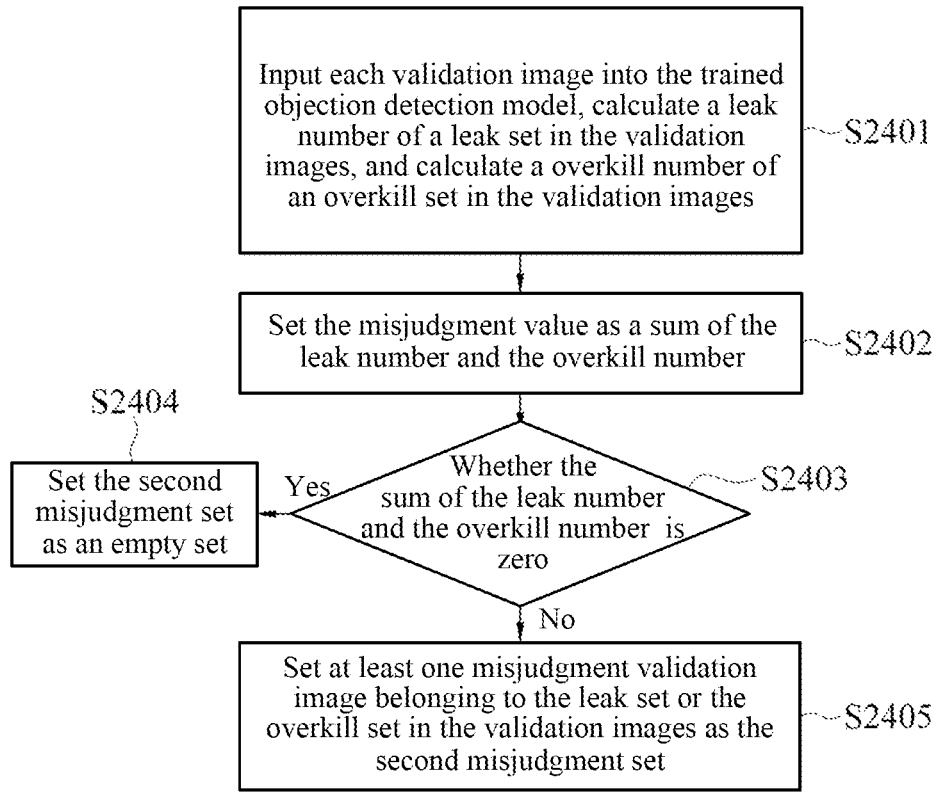
FIG. 24 is a training method flowchart according to an embodiment of the present invention.

The "misjudgment value" and "second misjudgment set" in step S2005 have different definition ways according to different applications. In some embodiments of the present invention, a leak set is formed by images which belong to the first category set in the validation images and are not detected to include the defect image regions belonging to the standard defect categories by the trained object detection model. An overkill set is formed by images which belong to the second category set in the validation images and are detected to include the defect image regions belonging to the standard defect categories by the trained object detection model. The "misjudgment value" is a sum of a leak number and an overkill number of overkills. The leak number is the number of images in the leak set, and the overkill number is the number of images in the overkill set. FIG. 24 is a training method flowchart according to an embodiment of the present invention. Referring to FIG. 24, in this embodiment shown as FIG. 24, step S2005 includes steps S2401-S2405.

In step S2401, the processing unit 101 will input each validation image from the validation set into the trained object detection model, calculate the leak number of the leak set in the validation images, and calculate the overkill number of the overkill set in the validation images. In step S2402, the processing unit 101 will set the misjudgment value as the sum of the leak number and the overkill number. In step S2403, the processing unit 101 will judge whether the sum of the leak number and the overkill number is zero. If the sum of the leak number and the overkill number is zero, step S2404 will be performed; and if the sum of the leak number and the overkill number is not zero, step S2405 will be performed. In step S2404, the processing unit 101 will set a second misjudgment set as an empty set in response to the sum of the leak number and the overkill number being zero. In step S2405, the processing unit 101 will set at least one misjudgment validation image belonging to the leak set or the overkill set in the validation images as the second misjudgment set in response to the sum of the leak number and the overkill number being not zero.

According to the way of definition of the "misjudgment value" and the "second misjudgment set", it is only needed to judge whether each validation image in the validation set belongs to the first category set or the second category set, so the validation images in the validation set do not need to be marked.

Referring to FIG. 20 again, in some embodiments of the present invention, step S2005 includes the following steps for processing the second misjudgment set. In this step, the processing unit 101 verify whether the second misjudgment set is non-empty or not. If the second misjudgment set is non-empty, the processing unit 101 will execute step S2005; and if the second misjudgment set is not non-empty (i.e. empty set), the processing unit 101 not process the second misjudgment set. In step S2005, the processing unit 101 displays a misjudgment validation image in the second misjudgment set through the user interface 104. Moreover, the processing unit 101 takes at least one correcting signal which is received by the user interface 104 and corresponds to at least one misjudgment set image as a second input, and corrects the second misjudgment set based on the second input.

In some embodiments of the present invention, the processing unit 101 will sequentially display the misjudgment validation images in the second misjudgment set through the user interface 104, and for the misjudgment validation image belonging to the leak set, the executor re-judges the defect image region of the misjudgment image previously categorized into the first category set. If the executor re-judges that the misjudgment validation image actually belongs to the first category set, the executor will input a correct signal as the correcting signal, and the processing unit 101 does not correct the misjudgment validation images after receiving the correct signal. If the executor re-judges that the misjudgment validation image belongs to the third category set, the executor will input a removal signal as the correcting signal, and the processing unit 101 will remove the misjudgment validation image from the validation set after receiving the removal signal (for example, the processing unit 101 can achieve the removal effect by directly modifying the category label of the misjudgment validation images into the third category set without directly deleting or moving the misjudgment validation images from an file level). If the executor re-judges that the misjudgment validation image belongs to the second category set, the executor will input a re-classification signal as the correcting signal, and the processing unit 101 will classify the misjudgment image into the second category set after receiving the re-classification signal (for example, the category label can be corrected). It is to be noted again that as described above, in actual operation, if the re-judgment result of the executor shows that the image does not belong to the original category set, the "category attribute" of the photo will be directly corrected into the re-judgment result whatever the image is re-judged into the second or third category set. When calculating the leak number or the overkill number, the image is only taken from the "first category set" and the "second category set", so if the image is marked as the third category set, it will be naturally excluded in next validation.

For the re-judgment of the validation set (the image belongs to the first category, but the object detection model does not detect the defect area), an analysis method adopted by the executor is to find out an image region, belonging to one of multiple defect categories, in the image; if the image region is found out, it is indicated that the judgment is correct (the category of the image does not need to be corrected); if the image region is not found out, it is needed to find out uncertain image region; if the uncertain image region is found out (the image region found out is re-judged to belong to the uncertain image region), the photo will be removed from the validation set; and if the uncertain image region cannot be found out, the category is corrected into the second category (the image is re-judged to belong to the second category). If the category of the image originally belonging to the first category in the validation set is corrected in the judgment process, because the validation set is randomly taken out from the data pool, correcting the category of the image in the validation set is equivalent to correcting the category of the image in the data pool.

For the misjudgment validation image belonging to the overkill set, the executor re-judge at least one defect image region, detected by the trained object detection model, of the misjudgment image. If the executor re-judges that the at least one defect image region, detected by the trained object detection model, of the misjudgment validation image is the real ok image region, the executor will input a correct signal as the correcting signal, and the processing unit 101 does not correct the misjudgment validation image after receiving the correct signal. If the executor re-judges that the misjudgment validation image belongs to the third category set, the executor will input a removal signal as the correcting signal, and the processing unit 101 will remove the misjudgment validation image from the validation set after receiving the removal signal (for example, the processing unit 101 can achieve the removal effect by directly modifying the category of the misjudgment validation image into the third category set without directly deleting or moving the misjudgment validation image from the file level). If the executor re-judges that at least one defect image region, detected by the trained object detection model, of the misjudgment validation image has a defect image region meeting the judgment standard, the executor will input a moving signal as the correcting signal, and after receiving the moving signal, the processing unit 101 will classify the misjudgment validation image into the first category set (for example, the category label can be corrected), and set the misjudgment validation image to belong to the first category set. It is to be noted again that as described above, in actual operation, if the re-judgment result of the executor shows that the image does not belong to the original category set, the "category attribute" of the photo will be directly modified into the re-judgment result whatever the image is re-judged into the second or third category set. When calculating the leak number or the overkill number, the image is only taken from the "first category set" and the "second category set", so if the image is marked as the third category set, it will be naturally excluded in next validation.

For the re-judgment of the validation set (the photo belongs to the second category, but the object detection model detects the defect area), the analysis method adopted by the executor is to re-judge the defect area found by the object detection model; if the executor verifies that the defect area found by at least one object detection model belongs to the image region in one of the multiple standard defect categories, the image will be corrected to belong to the first category; if the executor verifies that the defect area found by at least one object detection model belongs to the uncertain image region (the rest are real ok image regions), the image will be corrected to belong to the third category and removed from the validation set; and if the defect areas found by all object detection models belong to the real ok image regions, it is not needed to correct the category of the image. Similarly, for the images originally belonging to the second category in the validation set, if the category is corrected in the re-judgment process, the category of the corresponding images in the data pool will be synchronously corrected.

Figure 25:
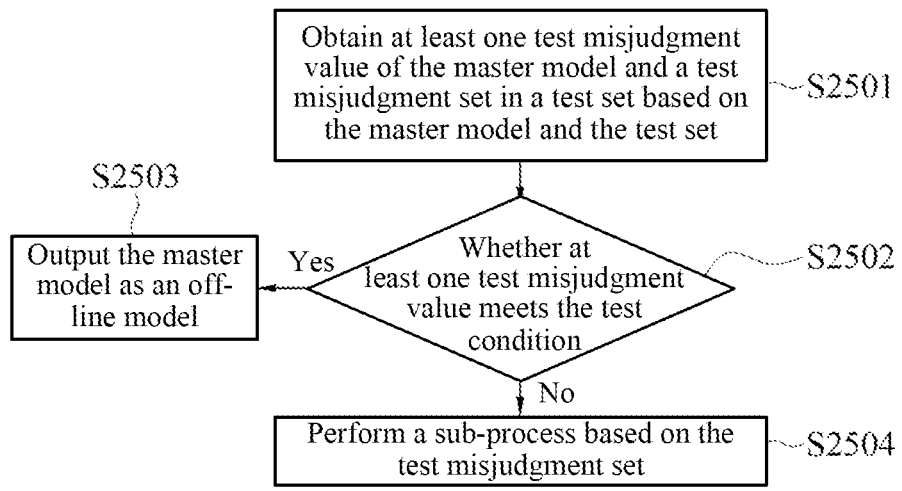
FIG. 25 is a test flowchart according to an embodiment of the present invention.

FIG. 25 is a test flowchart according to an embodiment of the present invention. Referring to FIG. 25, in this embodiment shown as FIG. 25, after the processing unit 101 obtains the master model, the processing unit 101 will execute steps S2501-S2504 based on the master model and the test set to determine whether to output the master model as an Off-line model. In step S2501, the processing unit 101 will obtain at least one test misjudgment value of the master model and the test misjudgment set in the test set based on the master model and the test set. In step S2502, the processing unit 101 judges whether the at least one test misjudgment value meets the test condition, executes step S2503 in response to the test misjudgment value meeting the test condition, and executes step S2504 in response to the at least one test misjudgment value not meeting the test condition. In step S2503, the processing unit 101 outputs the master model as the Off-line model. In step S2504, a sub-process will be executed based on the test misjudgment set. The test set includes multiple test images, and the test images include multiple first test images belonging to the first category and multiple second test images belonging to the second category. It is to be noted that the pattern distribution of the data image regions of the test set is a data distribution pattern representing the actual production information of the current production line, and the test set and the data pool are two independent sets. The test condition is to achieve the acceptable misjudgment rate of production line.

The "at least one test misjudgment value" and the "test misjudgment set" in step S2501 have different definition modes according to different applications. In some embodiments of the present invention, the "at least one test misjudgment value" and the "test misjudgment set" are defined by the same modes as the "misjudgment value" and the "second test misjudgment set". The test misjudgment value is the sum of the leak number and the overkill number. At least one test misjudgment image, belonging to the leak set or the overkill set, in the test image is set as the test misjudgment set. In some embodiments of the present invention, the processing unit 101 will input each test image in a test set into the master model, calculates the leak number for the number of individuals contained in the leak set of the test images, and calculates the overkill number for the number of individuals contained in the overkill set of the test images. Then, the processing unit 101 will set the test misjudgment value as the sum of the leak number and the overkill number. The processing unit 101 will judge whether the sum of the leak number and the overkill number is zero. If the sum of the leak number and the overkill number is zero, the test misjudgment set is set as an empty set in response to the sum of the leak number and the overkill number being zero; and if the sum of the leak number and the overkill number is not zero, at least one overkill and leak test misjudgment image belonging to the leak set or the overkill set in the test image is set as the test misjudgment set in response to the sum of the leak number and the overkill number being not zero.

In some embodiments of the present invention, the test condition is that the test misjudgment value is smaller than a preset value.

In practical application, an acceptable "number of leaks" and "number of overkills" may be defined respectively. The number of leaks represents a risk that defect products may pass through the detection system, so it is generally strictly required (the value can be small). The number of overkills represents the production loss that the test system may kill good products by mistake, generally as long as the requirement of factory management and control production cost is met, so it is generally not strictly required (the value can be large). In some embodiments of the present invention, the "at least one test misjudgment value" includes two test misjudgment values, and in order to facilitate description, the two test misjudgment values are respectively called a first test misjudgment value and a second test misjudgment value. The first test misjudgment value is the leak number, and the second test misjudgment value is the overkill number. At least one test misjudgment image belonging to the leak set or the overkill set in the test image is set as a test misjudgment set. Moreover, the test condition is that the first test misjudgment value is smaller than a preset leak number and the second test misjudgment value is smaller than a preset overkill number. The preset overkill number may be greater than the preset leak number.

In some embodiments of the present invention, the above steps include a first step and a second step to the processing unit 101 process the test misjudgment set based on the test validation input in response to the test misjudgment set being non-empty. In the first step, the processing unit 101 will display the overkill and leak test misjudgment image in the test misjudgment set through the user interface 104. In the second step, the processing unit 101 will take at least one correcting signal corresponding to at least one test misjudgment image received by the user interface 104 as the test validation input, and process the test misjudgment set based on the test validation input.

In some embodiments of the present invention, the processing unit 101 will sequentially display overkill and leak test misjudgment images in the test misjudgment set through the user interface 104. For the overkill and leak test misjudgment images belonging to the leak set, the executor will re-judge that the defect image region, previously classified to the first category set, of this overkill and leak test misjudgment images. If the executor re-judges that the overkill and leak test misjudgment images really belong to the first category set, the executor will input a correct signal as the correcting signal, and after receiving the correct signal, the processing unit 101 will not modify the overkill and leak test misjudgment images. If the executor re-judges that the overkill and leak test misjudgment images belong to the third category set, the executor will input a removal signal as the correcting signal, and after receiving the removal signal, the processing unit 101 will remove the overkill and leak test misjudgment images from the test set (for example, the processing unit 101 can achieve a removal effect by directly modifying the categories of the overkill and leak test misjudgment images into the third category set without directly deleting or moving the overkill and leak test misjudgment images from an file level). If the executor re-judges that the overkill and leak test misjudgment image belongs to the second category set, the executor will input a reclassification signal as the correcting signal, and after receiving the reclassification signal, the processing unit 101 will classify the overkill and leak test misjudgment image into the second category set (for example, a category label can be corrected). It is to be noted that the overkill and leak test misjudgment image is classified into the second category set without being directly deleted or moved from the archive level, and only the category of the overkill and leak test misjudgment image needs to be modified (for example, the category label can be corrected). As shown above, in actual operation, if the re-judgment result of the executor shows that the image does not belong to the original category set, the "category attribute" of the photo will be directly corrected into the re-judgment result whatever the image is re-judged into the second or third category set. When calculating the number of leaks or the number of overkills, the image is only taken from the "first category set" and the "second category set", so if the image is marked as the third category set, it will be naturally excluded in next test.

For the overkill and leak test misjudgment image belonging to the overkill set, the executor will re-judge at least one defect image region, detected by the trained object detection model, of the overkill and leak test misjudgment image. If the executor re-judges that the at least one defect image region, detected by the trained object detection model, of the overkill and leak test misjudgment image is the real ok image region, the executor will input a correct signal as the correcting signal, and after receiving the correct signal, the processing unit 101 does not modify the overkill and leak test misjudgment image. If the executor re-judges that the overkill and leak test misjudgment image belongs to the third category set, the executor will input a removal signal as the correcting signal, and after receiving the removal signal, the processing unit 101 will remove the overkill and leak test misjudgment image from the test set (for example, the processing unit 101 can achieve a removal effect by directly modifying the category of the overkill and leak test misjudgment image into the third category set without directly deleting or moving the overkill and leak test misjudgment image from an file level). If the executor re-judges that at least one defect image region, detected by the trained object detection model, of the overkill and leak test misjudgment image has a defect image region meeting the judgment standard, the executor will input a re-classification signal as the correcting signal, and after receiving the re-classification signal, the processing unit 101 will classify the overkill and leak test misjudgment image into the first category set (for example, the category label can be corrected). It is to be noted that the overkill and leak test misjudgment image is classified into the first category set and does not need to be directly deleted from an archive level, and only the classification of the overkill and leak test misjudgment image needs to be changed (for example, the category label of the overkill and leak test misjudgment image can be corrected). As shown above, in actual operation, if the re-judgment result of the executor shows that the image does not belong to the original category set, the "category attribute" of the photo will be directly corrected into the re-judgment result whatever the image is re-judged into the second or third category set. When calculating the leak number or the overkill number, the image is only taken from the "first category set" and the "second category set", so if the image is marked as the third category set, it will be naturally excluded in next test.

Figure 26:
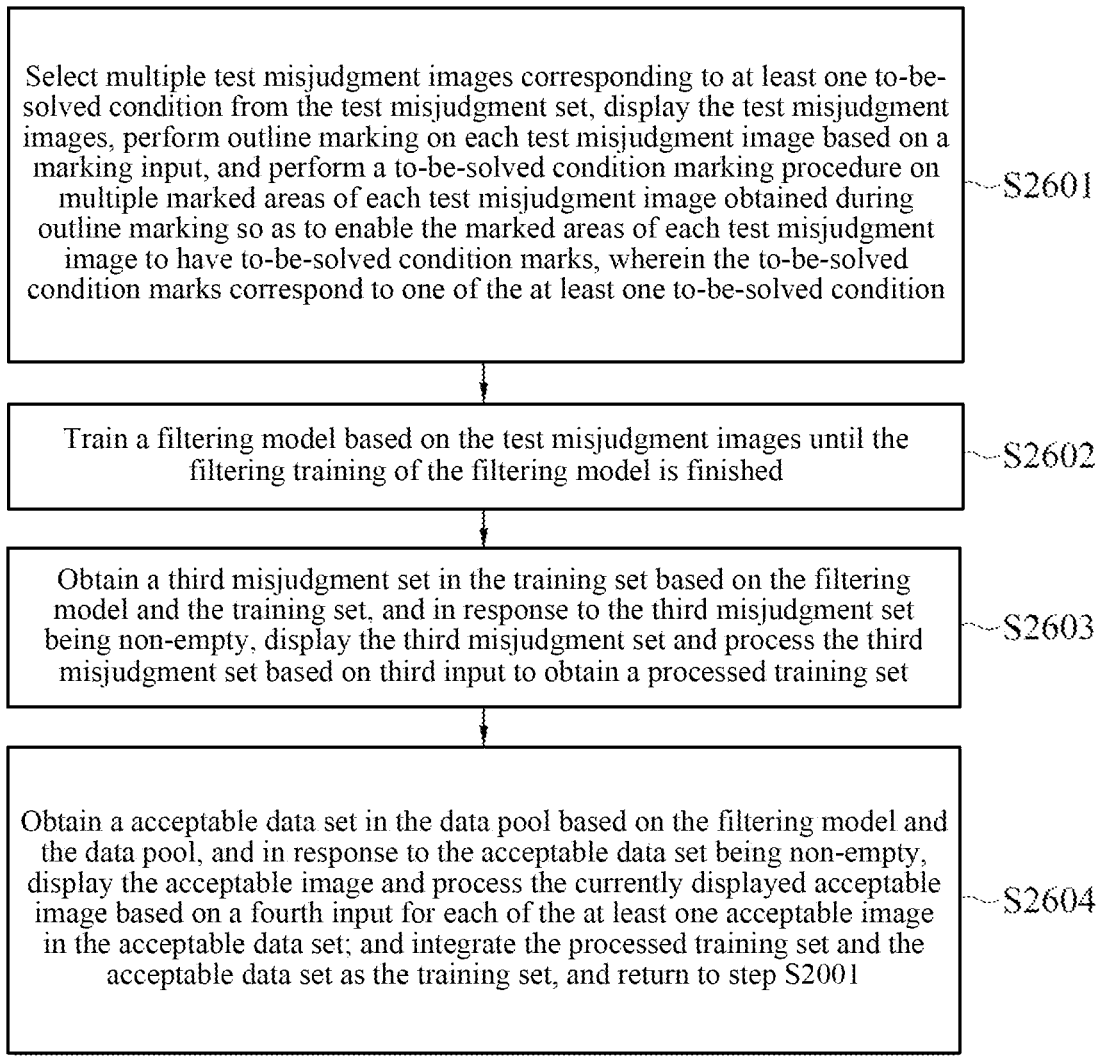
FIG. 26 is a sub-process flowchart according to an embodiment of the present invention.

FIG. 26 is a sub-process flowchart according to an embodiment of the present invention. Referring to FIG. 26, in this embodiment shown as FIG. 26, the sub-process includes step S2601 to step S2604. In step S2601, the processing unit 101 will select multiple test misjudgment images corresponding to at least one to-be-solved condition from test misjudgment set. The processing unit 101 will display the test misjudgment images, perform outline marking on each test misjudgment image based on a marking input, and perform a to-be-solved condition marking procedure on multiple marked areas of each test misjudgment image obtained during outline marking, so that the marked areas of each test misjudgment image have to-be-solved condition marks, wherein the to-be-solved condition marks correspond to one of the at least one to-be-solved condition.

Figure 11:
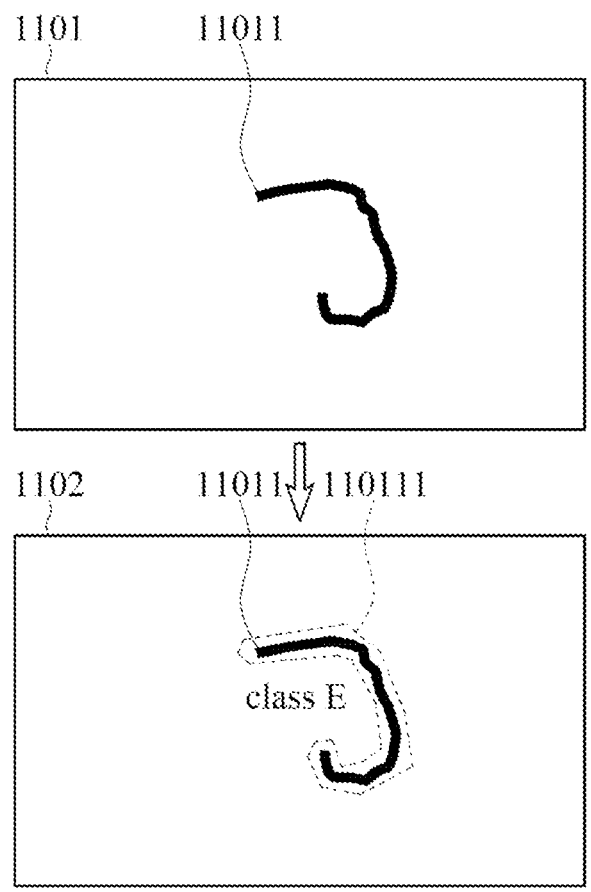
FIG. 11 is a schematic to-be-solved condition marking procedure diagram according to an embodiment of the present invention.
Figure 12:
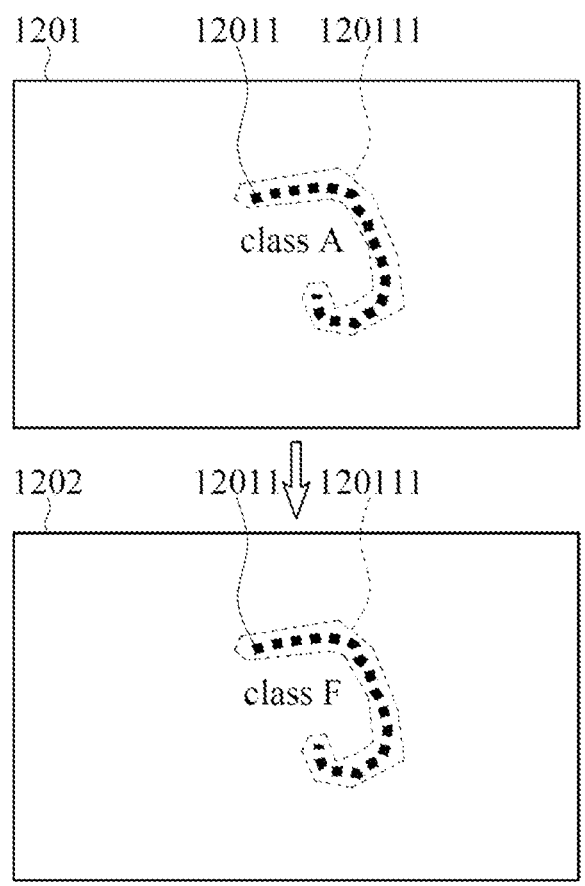
FIG. 12 is a schematic to-be-solved condition marking procedure diagram according to an embodiment of the present invention.

In some embodiments of the present invention, the at least one to-be-solved condition includes a leak condition and an overkill condition which are defined by the same way as the leak set and the overkill set, so more description is not made here. FIG. 11 is a schematic to-be-solved condition marking procedure diagram according to an embodiment of the present invention. FIG. 12 is a schematic to-be-solved condition marking procedure diagram according to an embodiment of the present invention. Referring to FIG. 26, FIG. 11, and FIG. 12, FIG. 11 and FIG. 12 are referred to describe the execution process of step S2601 in this embodiment. For the test misjudgment image corresponding to the leak condition, as shown in FIG. 11, the processing unit 101 will display the test misjudgment image 1101 corresponding to the leak condition, and the test misjudgment image 1101 includes an image region 11011 which is judged as a defect image region by the executor according to a judgment standard. The executor executes outline marking on the image region to mark an outline 110111 through the user interface 104, and specifies the to-be-solved condition mark of the image region 11011 as leak (marked as class E to represent leak). The signal generated by the executor operating the user interface 104 is the marking input, and the processing unit 101 marks the outline 110111 of the image region 11011 based on the marking input, sets the to-be-solved condition mark of the image region 11011 t as leak, and stores the modified test misjudgment image 1101 (shown as test misjudgment image 1102).

For the test misjudgment image corresponding to the overkill condition, as shown in FIG. 12, the processing unit 101 will display a test misjudgment image 1201 corresponding to the misjudgment condition, and the test misjudgment image 1201 includes an image region 12011 which is recognized to belong to the foreign matter category (so the marks is displayed as class A to represent the foreign matter category) by the master model and is displayed on the user interface 104 (shown as test misjudgment image 1201) with the outline marked outline 120111. The executor specifies the to-be-solved condition mark of the image region 12011 as overkill (marked as class F to represent the overkill) by means of the user interface 104. A signal generated by the executor operating the user interface 104 is the above-mentioned marking input, and the processing unit 101 will store the outline 120111 of the image region 12011 based on the above-mentioned marking input, set the to-be-solved condition mark of the image region 12011 as the overkill, and store the modified test misjudgment image 1201 (shown as test misjudgment image 1202).

Referring to FIG. 26, in step S2602, the processing unit 101 trains a filtering model until finishing the filtering training of the filtering model based on the test misjudgment image after the outline marking and the to-be-solved condition mark marking, wherein the architecture of the filtering model is the same as that of the master model, but at least one detection category of the filtering model includes the at least one to-be-solved condition. That is, the master model is defined to have the ability to detect the multiple defect categories (including standard defect categories and special defect categories), the filtering model is defined to have the ability to detect the at least one to-be-solved condition category, and the difference between the filtering model and the master model is only on the defined detection category. In some embodiments of the present invention, the above-mentioned "training a filtering model until finishing the filtering training of the filtering model" means that the "filtering model can correctly detect all the marked to-be-solved conditions", that is, "the leak number=0 (the number of individuals contained in the leak set=0)" of the to-be-solved conditions in the test misjudgment image for training is taken as the judgment basis. In some embodiments of the present invention, the abovementioned "training a filtering model until finishing the filtering training of the filtering model" means that the "filtering model can correctly detect all the marked to-be-solved conditions" "without capturing the unmarked area", that is, "the leak number=0 and the overkill number=0 (the number of individuals contained in the leak set=0 and the number of individuals contained in the overkill set=0)" of the to-be-solved conditions of the test misjudgment image for training is taken as the judgment basis.

In step S2603, the processing unit 101 will obtain the third misjudgment set in the training set based on the filtering model and the training set. In response to the third misjudgment set being non-empty, the processing unit 101 will display the third misjudgment set and process the third misjudgment set based on the received third input. Since the third misjudgment set is in the training set, processing the third misjudgment set is equivalent to processing the training set, so that the processed training set can be obtained after the third misjudgment set is processed.

The "third misjudgment set" in step S2603 has different definition ways according to different applications. In some embodiments of the present invention, the at least one to-be-solved condition includes the leak condition and the overkill condition. The "third misjudgment set" is defined as a filtering training image having an area belonging to the leak condition or an area belonging to the overkill condition predicted by the filtering model from the training set. A set of filtering training images belonging to the leak condition that is predicted by the filtering model from the training set is called a predicted leak set, and a set of filtering training images that is predicted by the filtering model from the training set and has the area belonging to the overkill condition is called a predicted overkill set. In some embodiments of the present invention, the processing unit 101 will input each training image in the training set into the filtering model, calculate the predicted leak number for the number of individuals contained in the predicted leak set in the training images, and calculate the predicted overkill number for the number of individuals contained in the predicted overkill set in the training images. The processing unit 101 will judge whether the sum of the predicted leak number and the predicted overkill number is zero or not. If the sum of the predicted leak number and the predicted overkill number is zero, the third misjudgment set is set as an empty set in response to the sum of the predicted leak number and the predicted overkill number being zero; and if the sum of the predicted leak number and the predicted overkill number is not zero, at least one filtering training image belonging to the predicted leak set or the predicted overkill set in the training images is set as the third misjudgment set in response to the sum of the predicted leak number and the predicted overkill number being non-zero.

In some embodiments of the present invention, the above-mentioned step includes the following first step and second step in response to the third misjudgment set being non-empty. The processing unit 101 will process the third misjudgment set based on a filtering and cleaning input. In the first step, the processing unit 101 will display filtering training images in the third misjudgment set through the user interface 104. In the second step, the processing unit 101 will take at least one correcting signal corresponding to at least one filtering training image received by the user interface 104 as the filtering and cleaning input, and process the third misjudgment set based on the filtering and cleaning input.

In some embodiments of the present invention, the processing unit 101 will sequentially display the filtering training images in the third misjudgment set through the user interface 104. For the filtering training images belonging to the predicted leak set, the executor will check whether an area, predicted to belong to the leak condition by the filtering model, on the filtering training image overlaps with an image region, originally marked as the defect image region, of the filtering training images or not. If yes, it is not needed to process by the executor. If not, the executor will execute the following cleaning work: (only process for the "image region which is not originally marked as the defect image region", but the "area predicted to belong to the leak condition by the filtering model"): (1) The area predicted to belong to the leak condition by the filtering model is judged to belong to the defect image region, and a correct defect category is designated to the area predicted to belong to the leak condition by the filtering model. (2) The area predicted to belong to the leak condition by the filtering model is judged to belong to an uncertain image region, and the area predicted to belong to the leak condition by the filtering model is designated as belonging to the uncertain defect category. (3) the area predicted to belong to the leak condition by the filtering model is judged to belong to the real ok image region, and the area predicted to belong to the leak condition by the filtering model is designated as belonging to non-category.

In some embodiments of the present invention, the processing unit 101 will check whether the area, predicted to belong to the leak condition by the filtering model, on the filtering training image overlaps with the image region, originally marked as the defect image region, of the filtering training image based on the following steps: the processing unit 101 calculates the Intersection over Union (IoU) of the area, predicted to belong to the leak condition by the filtering model, on the filtering training image, and the image region, originally marked as the defect image region, of the filtering training image. If the calculated Intersection over Union is greater than a preset overlapping ratio (for example, 50%), the processing unit 101 will judge that the area, predicted to belong to the leak condition by the filtering model, on the filtering training image overlaps with the image region, originally marked as the defect image region, of the filtering training image. If the calculated Intersection over Union is less than or equal to the preset overlapping ratio (for example, 50%), the processing unit 101 will judge that there is no overlapping. If the Intersection over Union calculated by the processing unit 101 is greater than the preset overlapping ratio (for example, 50%), the processing unit 101 will skip this image region, and finally the user interface 104 only displays the area which is predicted to belong to the leak condition by the filtering model, on the filtering training image and has the Intersection over Union less than or equal to the preset overlapping ratio (for example, 50%), and then the executor executes re-judgment processing. As long as the executor re-judges that the area, predicted to belong to the leak condition by the filtering model, on the filtering training image, is one of the defect image region/uncertain image region/real ok image region, the processing unit 101 will automatically implement one of the above marking operations (1)-(3).

For the filtering training image belonging to the predicted overkill set, the executor will check whether the area, predicted to belong to the overkill condition by the filtering model, on the filtering training image overlaps with the image region, originally marked as the defect image region, of the filtering training image. If not, it is not needed to process by the executor. If yes, the executor will perform the following cleaning work: (only process for the "image region originally marked as the defect image region" and the "area predicted to belong to the overkill condition by the filtering model"): (1) The image region originally marked as the defect image region is judged to belong to the defect image region, whether the image region is still verified as the defect image region after "the overlapped part of the outline area of the original defect image region and the area predicted by the filtering model is subtracted is checked. If yes, the outline area of the original defect image region is corrected into the reduced area, that is, the outline area of the original defect image region is corrected into an area obtained after the overlapped part of the outline area of the original defect image region and the area predicted by the filtering model is subtracted. Otherwise, it is not needed to process. (2) The image region originally marked as the defect image region is judged to belong to the uncertain image region, and the image region originally marked as the defect image region is designated as belonging to the uncertain defect category. (3) the image region originally marked as the defect image region is judged to belong to the real ok image region, the defect category and the outline of the image region originally marked as the defect image region are deleted so as to modify the image region into the real ok image region.

In some embodiments of the present invention, the processing unit 101 will check whether the area, predicted to belong to the overkill condition by the filtering model, on the filtering training image overlaps with the image region, originally marked as the defect image region by the filtering training image based on the following steps: the processing unit 101 calculates the Intersection over Union (IoU) of the area, predicted to belong to the overkill condition by the filtering model, on the filtering training image, and the image region, originally marked as the defect image region by the filtering training image. If the calculated Intersection over Union is greater than a preset overlapping ratio (for example, 50%), the processing unit 101 will judge that the area, predicted to belong to the overkill condition by the filtering model, on the filtering training image overlaps with the image region, originally marked as the defect image region by the filtering training image. If the calculated Intersection over Union is less than or equal to the preset overlapping ratio (for example, 50%), the processing unit 101 will judge that there is no overlapping. If the Intersection over Union calculated by the processing unit 101 is less than or equal to the preset overlapping ratio (for example, 50%), the processing unit 101 will skip the image region, and finally the user interface 104 will only display the area on the filtering training image after "subtracting the overlapped area to the area predicted by the filtering model from the outline area of the original defect image region" by the filtering model having the Intersection over Union greater than the preset overlapping ratio (for example, 50%), and then the executor executes the re-judgment processing. As long as the executor re-judges that the area is one of the defect image region/uncertain image region/real ok image region, the processing unit 101 will automatically implement one of the marking operations (1)-(3).

Figure 13:
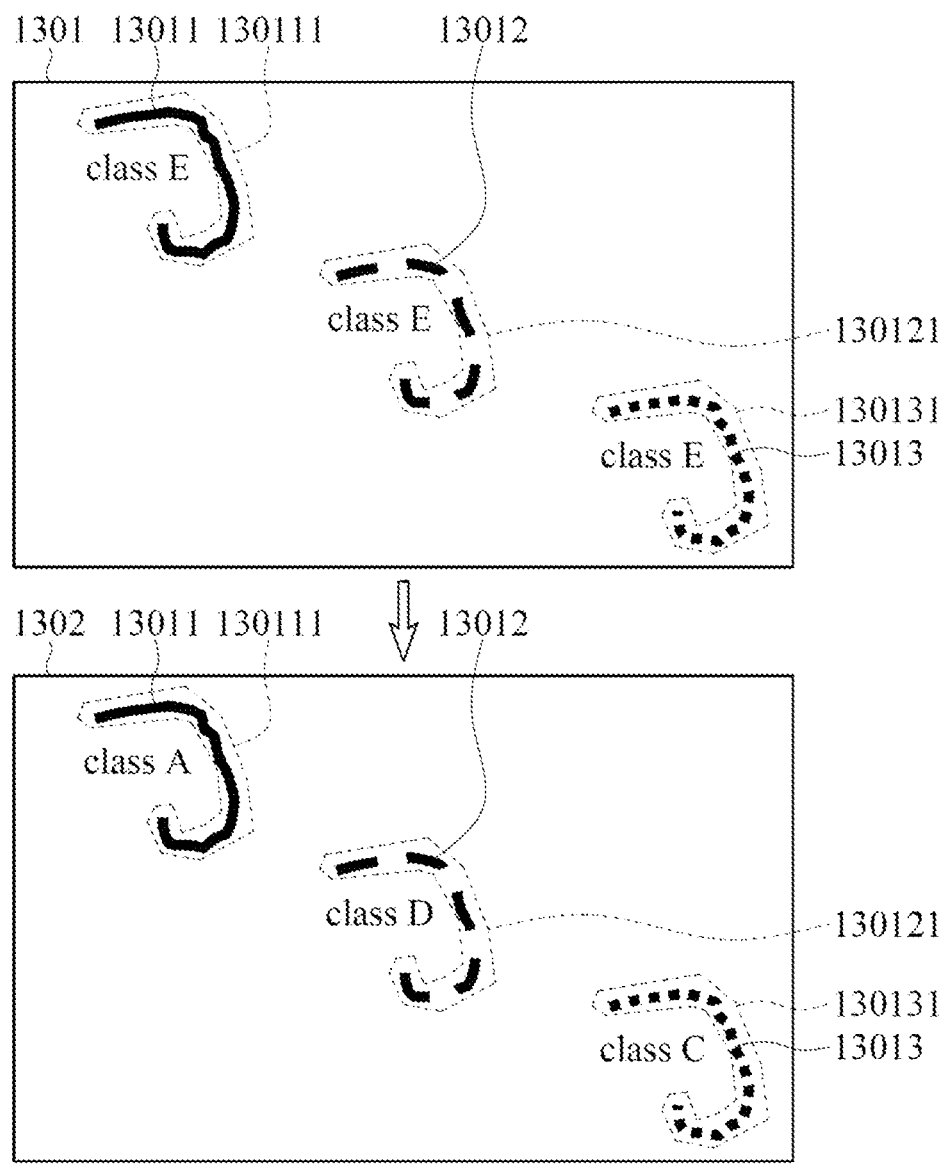
FIG. 13 is a schematic predicted leak set cleaning operation diagram according to an embodiment of the present invention.
Figure 14:
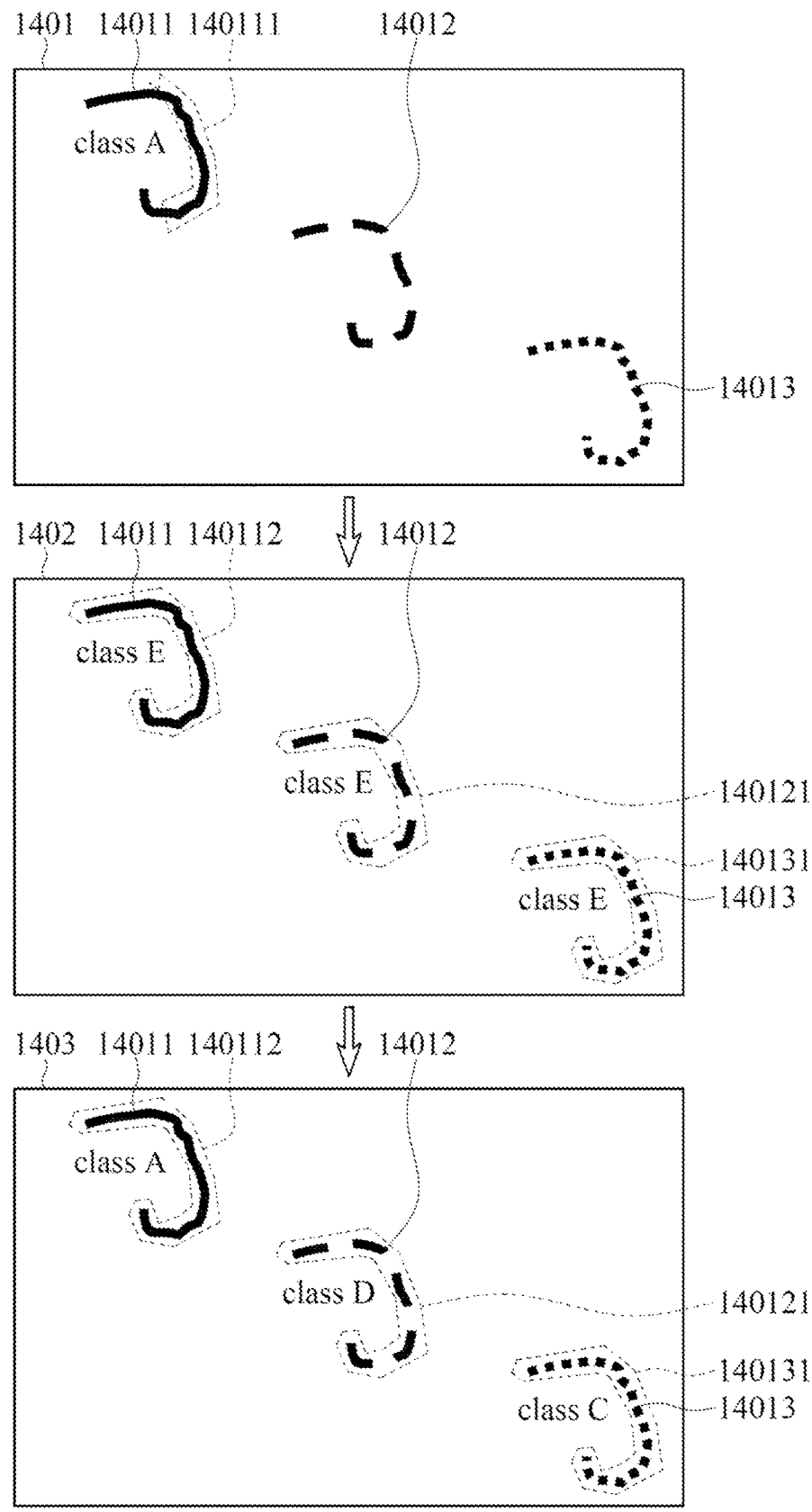
FIG. 14 is a schematic predicted leak set cleaning operation diagram according to an embodiment of the present invention.
Figure 15:
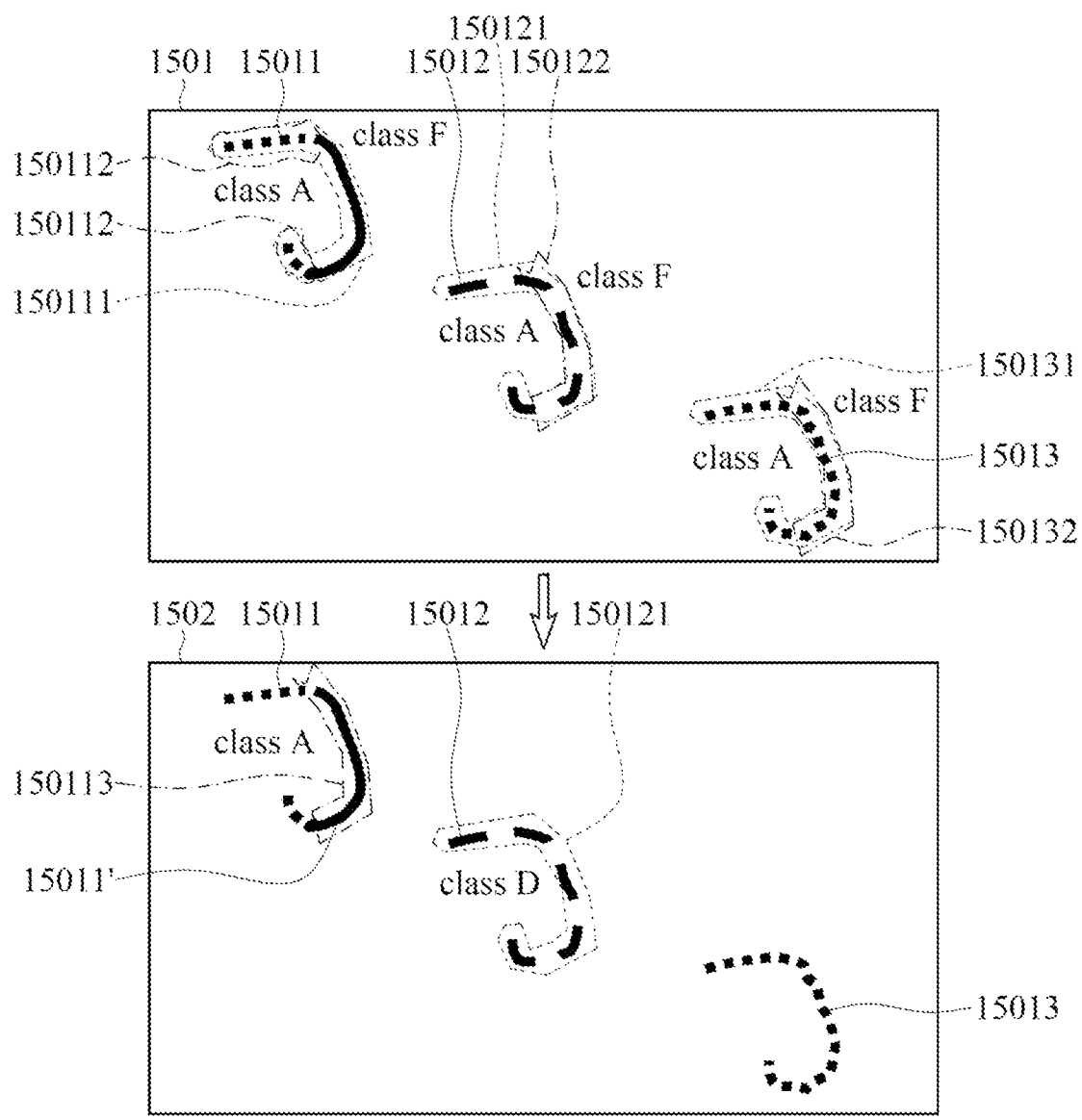
FIG. 15 is a schematic predicted overkill set cleaning operation diagram according to an embodiment of the present invention.

FIG. 13 is a schematic predicted leak set cleaning operation diagram according to an embodiment of the present invention. FIG. 14 is a schematic predicted leak set cleaning operation diagram according to an embodiment of the present invention. FIG. 15 is a schematic predicted overkill set cleaning operation diagram according to an embodiment of the present invention. Firstly, it is to be noted that the above non-category use time is that an area belonging to the leak condition is found out from the training image by the filtering model, but the executor re-judges and defines that the area belongs to the real ok image region, the area will be marked as "non-category". Referring to FIG. 13, the processing unit 101 will display the filtering training image 1301 shown as FIG. 13 by the user interface 104. The filtering training image 1301 includes an area 13011, an area 13012, and an area 13013 which are predicted to belong to the leak condition by the filtering model, and the area 13011, the area 13012, and the area 13013 are originally marked as belonging to defect-free categories. The area 13011 is provided with an outline 130111, the area 13012 is provided with an outline 130121, and the area 13013 is provided with an outline 130131.

If it is judged that the area 13011 belongs to the defect image region in the foreign matter category, the area 13011 will be designated as belonging to the foreign matter category (therefore, class A is marked to represent the foreign matter category) and the outline 130111 thereof is maintained. If it is judged that the area 13012 belongs to the uncertain image region, the area 13012 will be designated as belonging to the uncertain defect category (therefore, class D is marked to represent the uncertain defect category) and an outline 130121 thereof is maintained. If it is judged at the area 13013 belongs to the real ok image region, the region 13013 will be designated as belonging to non-category (therefore, class C is marked to represent non-category) and an outline 130131 thereof. A signal generated by the executor operating the user interface 104 is the correcting signal. The processing unit 101 will modify the filtering training image 1301 with the correcting signal received by the user interface 104, and store the modified filtering training image 1301 (shown as filtering training image 1302).

Referring to FIG. 14, the training image 1401 includes an image region 14011 originally marked to belong to the foreign matter category (therefore, class A is marked to represent the foreign matter category), an image region 14012 belonging to the uncertain image region, and an image region 14013 belonging to the real ok image region. The image region 14011 is marked with an outline 140111. The processing unit 101 will display a filtering training image 1402 corresponding to the training image 1401. In the filtering training image 1402, the image region 14011 is included in the area predicted to belong to the leak condition by the filtering model. Because the Intersection over Union of the outline 140111 to the area, originally marked as the defect image region, of the filtering training image is less than the preset threshold but is not 0, the processing unit 101 will display the image region 14011 and the outline 140112. The image region 14012 is included in the region predicted to belong to the leak condition by the filtering model, so the processing unit 101 will display the image region 14012 and the outline 140121. The image region 14013 is included in the area predicted to belong to the leak condition by the filtering model, so the processing unit 101 will display the image region 14013 and the outline 140131. If it is judged that the image region 14011 belongs to the defect image region of the foreign matter category, the image region 14011 will be designated as belonging to the foreign matter category (therefore, class A is marked to represent the foreign matter category) and the outline thereof is corrected into an outline 140112. If it is judged that the area 14012 belongs to the uncertain image region, the area 14012 will be designated as belonging to the uncertain defect category (therefore, class D is marked to represent the uncertain defect category) and an outline thereof 140121 is added. If it is judged that the area 14013 belongs to the real ok image region, the area 14013 will be designated as belonging to non-category (therefore, class C is marked to represent non-category) and an outline thereof 140131 is added (shown as filtering training image 1403).

Referring to FIG. 15, the processing unit 101 will display a filtering training image 1501 shown as FIG. 15 by the user interface 104. The filtering training image 1501 includes an image region 15011, an image region 15012, and an image region 15013 of the image region originally marked as belonging to the foreign matter category (therefore, class A is marked to represent the foreign matter category). The image region 15011 has an original outline 150111, the image region 15012 is provided with an original outline 150121, and the image region 15013 is provided with an original outline 150131. If it is judged that the image region 15011 is the image region belonging to the foreign matter category, and after the executor checks that the overlapped part to the area 150112 predicted by the filtering model is subtracted from the originally marked outline 150111 of the image region 15011 and still verifies that the image region is the image region belonging to the foreign matter category, the outline of the image region 15011 will be corrected into the subtracted outline 150113 (herein the image region, belonging to the foreign matter category, actually included in the outline 150113 is an image region 15011'). The image region 15012 is provided with an originally marked outline 150121 and an area 150122 predicted by the filtering model, but if it is judged that the image region 14012 does not belong to the uncertain image region, the image region 15012 will be designated as belonging to the uncertain defect category, and the originally marked outline 150121 is maintained. The image region 15013 is provided with the originally marked outline 150131 and the area 150132 predicted by the filtering model, but if it is judged that the image region 15013 belongs to the real ok image region, the foreign matter category label (class A) and the outline of the image region 15013 will be deleted to modify into the real ok image region. A signal generated by the executor operating the user interface 104 is the correcting signal, and the processing unit 101 will modify the filtering training image 1501 with the correcting signal received by the user interface 104, and store the modified filtering training image 1501 (shown as filtering training image 1502).

Referring to FIG. 26, in step S2604, the processing unit 101 will obtain an acceptable data set from the data pool based on the filtering model and the data pool. In response to the acceptable data set being non-empty, the processing unit 101 will display each of at least one acceptable image in the acceptable data set and processes the currently displayed acceptable image based on a fourth input. The processing unit 101 will integrate the processed training set and the acceptable data set as the training set, and return to step S2001 for restarting. In some embodiments, the integrating processed training set and the acceptable data set are used as training sets represents using a union set of the processed training set and the acceptable data set as the training set.

The "acceptable data set" in step S2604 has different definition modes according to different applications. In some embodiments of the present invention, the aforementioned at least one to-be-solved condition includes the leak condition and the overkill condition. The obtaining a acceptable data set from the data pool based on the filtering model and the data pool includes the following first step, second step, and third step. In the first step, the processing unit 101 inputs all the first images in the first category set to the filtering model, and collects the first condition images in the first category set, each one of the first condition images has the area predicted to belong to the leak condition by the filtering model. In response to the set composed of the first condition image is non-empty, the processing unit 101 displays each first condition image through the user interface 104. If the executor judges that the area predicted to belong to the leak condition by the filtering model in the currently displayed first condition image is the defect area, the processing unit 101 will classify the currently displayed first condition image into the "acceptable data set". Otherwise, the processing unit 101 will classify the currently displayed first condition image into the "non-acceptable data set".

Figure 16:
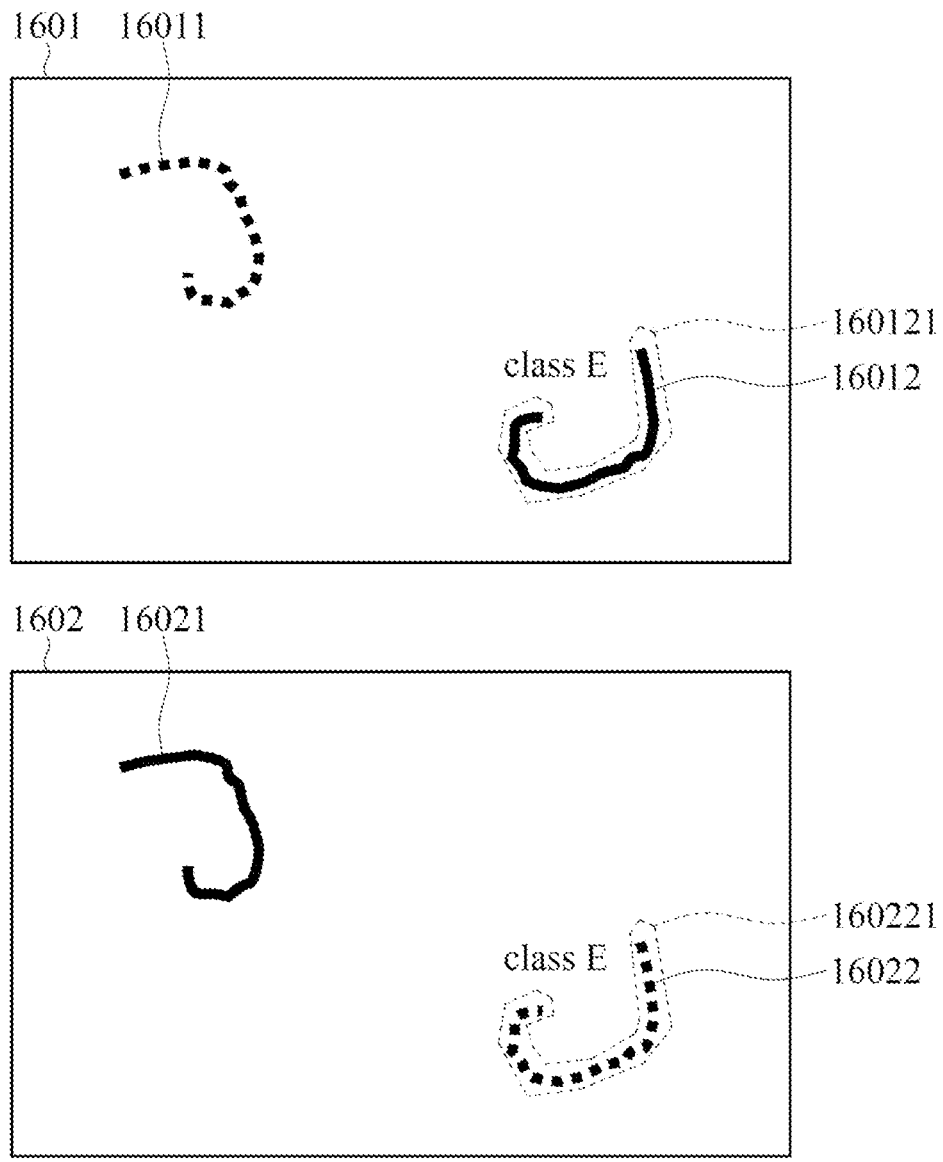
FIG. 16 is a schematic acceptable data filtering diagram according to an embodiment of the present invention.

FIG. 16 is a schematic acceptable data filtering diagram according to an embodiment of the present invention. The first step is described below with reference to FIG. 16. Referring to FIG. 16, the processing unit 101 displays the first condition image 1601 through the user interface 104. The first condition image 1601 includes an image region 16011 belonging to the real ok image region and a region 16012 predicted to belong to the leak condition by the filtering model. The region 16012 is marked as class E to represent leak. The region 16012 is provided with an outline

160121. The executor judges that the area 16012 predicted to belong to the leak by the filtering model from the currently displayed first condition image 1601 belongs to one of the multiple defect categories, so the processing unit 101 will classify the currently displayed first condition image 1601 into the "acceptable data set". The processing unit 101 will display a first condition image 1602 through the user interface 104. The first condition image 1602 includes an image region 16021 belonging to the defect image region and an area 16022 predicted to belong to the leak condition by the filtering model. The area 16022 is marked as class E to represent leak. The area 16022 is provided with an outline 160221. The executor judges that the area 16022 predicted to belong to the leak condition by the filtering model in the currently displayed first condition image 1602 is not the defect area, so the processing unit 101 will classify the currently displayed first condition image 1602 into the "non-acceptable data set".

In the second step, the processing unit 101 inputs all second images in the second category set to the filtering model, and collects the second condition images in the second category set, each one of the second condition images has the area predicted to belong to the overkill condition by the filtering model. In response to the set composed of the second condition images is non-empty, the processing unit 101 displays each second condition image through the user interface 104. If the executor judges that the area predicted to belong to the overkill condition by the filtering model in the currently displayed second condition images belongs to the real ok image region and all image regions of the currently displayed second condition images belong to the real ok image region, the processing unit 101 will classify the currently displayed second condition images into the "acceptable data set". Otherwise, the processing unit 101 will classify the currently displayed second condition images into the "non-acceptable data set".

Figure 17:
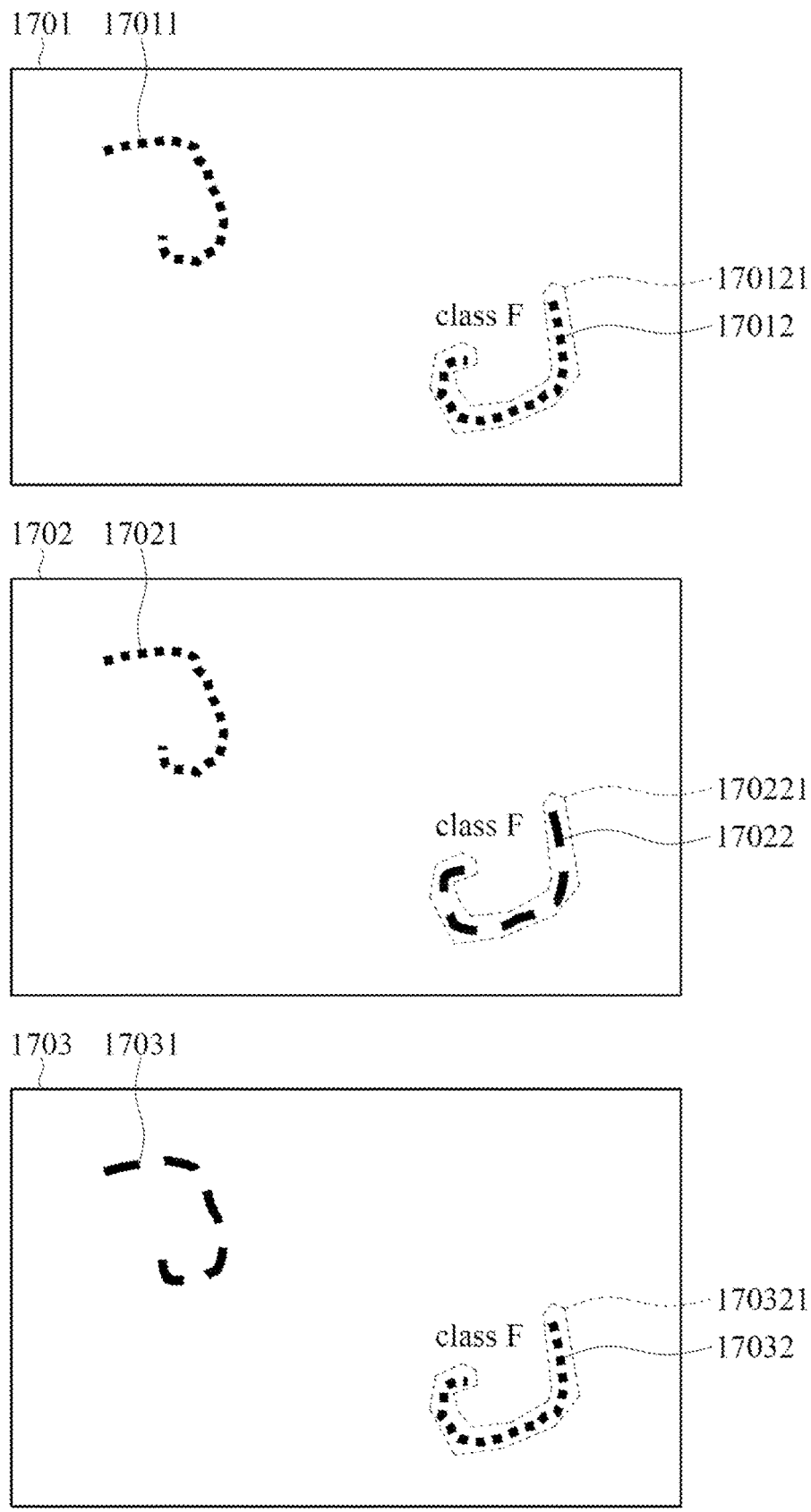
FIG. 17 is a schematic acceptable data filtering diagram according to an embodiment of the present invention.

FIG. 17 is a schematic acceptable data filtering diagram according to an embodiment of the present invention. The second step is described below with reference to FIG. 17. Referring to FIG. 17, the processing unit 101 displays a second condition image 1701 through the user interface 104. The second condition image 1701 includes an image region 17011 belonging to the real ok image region, and an area 17012 predicted to belong to the overkill condition by the filtering model. The region 17012 is marked as class F to represent overkill. The area 17012 is provided with an outline 170121. The executor judges that the area 17012 predicted to belong to the overkill condition by the filtering model from the currently displayed second condition image 1701 belongs to the real ok image region, and all the image regions of the currently displayed second condition image belong to the real ok image regions, so the processing unit 101 classifies the currently displayed second condition image 1701 into the "acceptable data set". The processing unit 101 displays a second condition image 1702 through the user interface 104. The second condition image 1702 includes an image region 17021 belonging to real ok image region and an area 17022 predicted to belong to the overkill condition by the filtering model. The area 17022 is marked as class F to represent overkill. The area 17022 is provided with an outline 170221. It is to be noted that the second condition image 1702 is theoretically not in the real ok category of the data pool, but the data pool may still have a small amount of images belonging to the third category in actual condition, so this hypothesis example is a processing method for such condition. The executor judges that the area 17022 predicted to belong to the overkill condition by the filtering model from the currently displayed second condition image 1702 does not belong to the real ok image region, so the processing unit 101 will classify the currently displayed second condition image 1702 into the "non-acceptable data set". The processing unit 101 displays the second condition image 1703 through the user interface 104. The second condition image 1703 includes an image region 17031 judged to belong to uncertain image region by the executor, and an area 17032 predicted to belong to the overkill condition by the filtering model. The area 17032 is marked as class F to represent overkill. The area 17032 is provided with an outline 170321. It is to be noted that image like the second condition image 1703 is theoretically not in the real ok category of the data pool, but in an actual situation, the data pool may still have a small amount of images belonging to the third category, so this hypothesis example is a processing method for such condition. Although the executor judges that the area 17032 predicted to belong to the leak condition by the filtering model from the currently displayed second condition image 1703 belongs to the real ok image region, but the image region 17031 does not belong to the real ok image region, so the processing unit 101 classifies the currently displayed second condition image 1703 into the "non-acceptable data set".

In the third step, the processing unit 101 takes the "acceptable data set" from the data pool.

In some embodiments of the present invention, a fourth step is further executed after the third step. In the fourth step, the processing unit 101 will display the "non-acceptable data set" through the user interface 104. If the executor finds that an image in the "non-acceptable data set" is subjected to a problem of classification determination standard on real ok image region/uncertain image region/defect image region, it is needed to verify and correct the category of the image in the data pool (for example, the second condition image 1703 is taken from the second data set, then the executor re-judges, and the second condition image 1703 includes an image region 17031 belonging to the uncertain image region, and an image region 17032 belonging to the real ok image region after the re-judgment of the executor. Therefore, the second condition image 1703 belongs to the third category set, and the processing unit 101 corrects the second condition image 1703 to belong to the third category set based on the re-judgment of the executor).

Referring to FIG. 26, in this embodiment shown as FIG. 26, step S2604 further includes: the processing unit 101 displays at least one detection area detected by the filtering model for each of at least one acceptable image in the acceptable data set, and performs a defect category marking procedure on the at least one detection area based on the fourth input, so that the at least one detection area of each of the at least one acceptable image has a defect category label, wherein the defect category mark corresponds to one of the defect categories.

In some embodiments of the present invention, the at least one to-be-solved condition includes the leak condition and the overkill condition. The processing unit 101 displays at least one detection region detected by the filtering model for each of at least one acceptable image in the acceptable data set by the user interface 104. The executor performs defect category marking procedure on the at least one detection region through the user interface 104, thereby enabling the at least one detection region of each of the at least one acceptable image to have a defect category mark. A signal generated by the executor operating the user interface 104 is the fourth input.

In this embodiment, for the acceptable image belonging to the first condition images in the acceptable data set, a correct defect category is specified for the region predicted to belong to the overkill condition by the filtering model, and whether there is a defect image region in the area predicted to belong to the leak condition by other non-filtering models is checked. If yes, a correct defect category is also specified. For the acceptable image belonging to the second condition images in the acceptable data set, the area excepting the area predicted to belong to the overkill condition by the filtering model is specified to belong to a special defect category of non-category.

Figure 18:
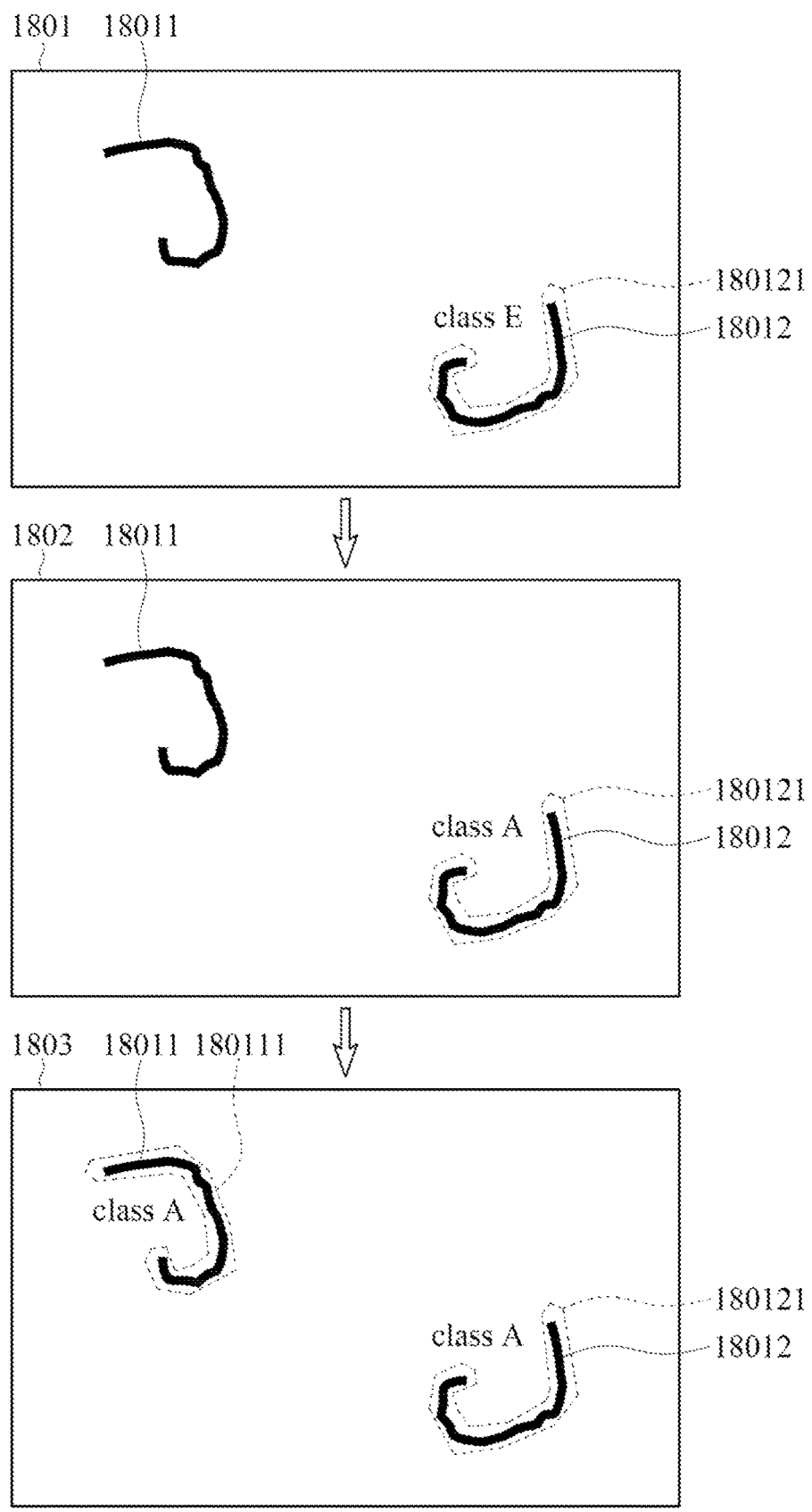
FIG. 18 is a schematic acceptable image defect category marking procedure diagram according to an embodiment of the present invention.
Figure 19:
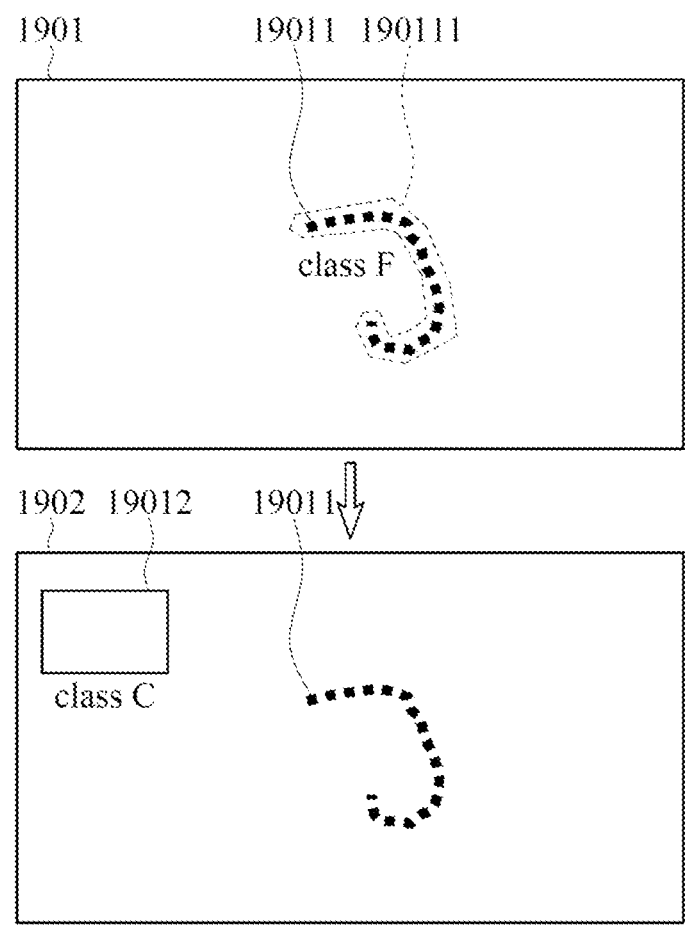
FIG. 19 is a schematic acceptable image defect category marking procedure diagram according to an embodiment of the present invention.

FIG. 18 is a leak condition acceptable image defect category marking procedure diagram according to an embodiment of the present invention. FIG. 19 is an overkill condition acceptable image defect category marking procedure diagram according to an embodiment of the present invention. The above steps are described below by FIG. 18 and FIG. 19 as examples. In this embodiment shown as FIG. 18, the processing unit 101 displays a acceptable image 1801 belonging to the first condition image through the user interface 104. The acceptable image 1801 includes an area 18012 which is predicted to belong to the leak condition by the filtering model and is re-judged to belong to the foreign matter category by the executor. The area 18012 is marked as class E to represent leak and the area 18012 is provided with an outline 180121. The acceptable image 1801 also includes an image region 18011 which is predicted to have an area belonging to the leak condition by the non-filtering model and is re-judged to belong to the foreign matter category by the executor. The executor specifies a correct defect category as the foreign matter category (marked as class A) for the region 18012 and maintains the outline 180121 (shown as acceptable image 1802), and the executor marks the outline 180111 for the image region 18011 and specifies a correct defect category as a foreign matter category (marked as class A) (shown as acceptable image 1803).

The above non-category use time is that the filtering model predicts an area belonging to the overkill condition (that is, in order to solve the overkill problem, the filtering model selects an image suggested to be added into the training set from the data pool), the re-judgment area of the executor belongs to the real ok image region, the executor deletes the outline and does not give any mark to the original area, and an area other than the area predicted to belong to the overkill condition by the filtering model is designated as a special defect category of non-category. In this embodiment shown as FIG. 19, the processing unit 101 displays an acceptable image 1901 belonging to the second condition image by the user interface 104. The acceptable image 1901 includes an area 19011 predicted to belong to the overkill condition by the filtering model. The area 19011 is marked as class F to represent overkill. The area 19011 is provided with an outline 190111. If the executor re-judges that the area 19011 belongs to the real ok image region, the executor will delete the outline 190111 and does not give any mark to the original area 19011, and the executor will designate an area 19012 other than the area 19011 predicted to belong to the overkill condition by the filtering model as the special defect category of non-category (shown as acceptable image 1902).

In the above embodiment, the processing unit 101 obtains the master model and then obtains the test misjudgment value of the master model and the test misjudgment set in the test set based on the master model and the test set. In response to the test misjudgment value meeting the test condition, the processing unit 101 outputs the master model as an Off-line model. However, the above procedure can be executed by another system.

Referring to FIG. 1, in some embodiments of the present invention, the test system implements an electronic device 100 shown as FIG. 1. The test system itself stores the test set. The processing unit 101 is configured to execute the following steps: receiving the master model, and storing the received master model in the non-volatile memory 103 for subsequent use; obtaining the test misjudgment value of the master model and the test misjudgment set in a test set based on the master model and the test set; outputting the master model as the off-line model in response to the misjudgment value meeting the test condition; and outputting the master model and the test misjudgment set in response to the test misjudgment value not meeting the test condition. The test set includes multiple test images, and the test images includes multiple first test images belonging to the first category and multiple second test images belonging to the second category. As described above, that the first images belong to the first category indicates that the images are judged to include at least one defect image region belonging to one of the multiple standard defect categories, and that the images belong to the second category indicates that the images are judged to exclude the image region belonging to one of the defect categories. In some embodiments of the present invention, the processing unit 101 outputs the master model and the test misjudgment set back to the training system to continue the aforementioned sub-process.

The processing unit 101 may use at least one correcting signal corresponding to at least one test misjudgment image in the test misjudgment set received by the user interface 104 as a test validation input, and process the test misjudgment set based on the test validation input. Various embodiments of functions executed by the testing system can refer to the above embodiments, so no more description is made herein.

In the above embodiments, although the training system responds to the test misjudgment value not meeting the test condition to execute a sub-process based on the test misjudgment set so as to update the training set, and the above sub-process may be executed by another system.

Referring to FIG. 1 again, in some embodiments of the present invention, the data filtering system implements the electronic device 100 shown as FIG. 1. The processing unit 101 is configured to execute the following steps: receiving the master model, the data pool, the training set, and the test misjudgment set, and storing the received master model and test misjudgment set in the non-volatile memory 103 for subsequent use and processing. The processing unit 101 stores the received data pool and training set in a large memory space, accesses the data from the data pool and training set according to the relevant location when needed, and loads the required data into the internal memory for subsequent processing. Selecting multiple test misjudgment images corresponding to at least one to-be-solved condition are from the test misjudgment set. Displaying the test misjudgment images, and marking outline for each test misjudgment image based on a marking input. Carrying out a to-be-solved condition marking procedure for multiple marked areas of each test misjudgment image obtained during outline marking, to enable the marked areas of each test misjudgment image to have to-be-solved condition marks, wherein the to-be-solved condition marks correspond to one of the at least one to-be-solved condition. Based on the test misjudgment images, training the filtering model until a filtering training of the filtering model is finished; wherein the structure of the filtering model is the same as that of the master model, and at least one detection category of the filtering model includes at least one to-be-solved condition. Obtaining a misjudgment set in the training set based on the filtering model and the training set, and displaying the misjudgment set and processing the misjudgment set based on a third input in response to the misjudgment set being non-empty. Based on the filtering model and the data pool, obtaining an acceptable data set from the data pool, and in response to the acceptable data set being non-empty, displaying the currently displayed acceptable image and processing the currently displayed acceptable image based on the fourth input for each acceptable image in the acceptable data set. Integrating the misjudgment set processed and the acceptable data set as the training set.

The processing unit 101 displays the above various images by the user interface 104, and receives various operator operation signals received by the user interface 104 to process the above various data. Various embodiments of functions executed by the data filtering system may refer to the above various embodiments, and will not be repeated herein.

In some embodiments of the present invention, the off-line model will be outputted as an online object detection model to be deployed in a factory production environment for executing detection operation. The online object detection model obtained based on the above embodiment has the detection capability required by general production line production data, but along with time change, the factory production environment may derive data with a "variation type". In this case, it is needed to retrain the online object detection model deployed in the factory production environment with new training set data, so that the original off-line model can have the response capability of the data with the "variation type".

In some embodiments of the present invention, the executor executes sampling inspection and judgment of a certain ratio according to a production line quality control standard for the photo detected by the online object detection model (namely the current off-line model) in the actual production environment, and judges whether to start a retraining process of the model according to the sampling inspection and judgment. The executor divides the sampled and inspected photo into an image (also called an incorrect judgment image) "with misjudgment problem" and an image (also called a correct judgment image) "without misjudgment problem" according to the re-judgment result. A set formed by the images "without the misjudgment problem" is called an online correct set, a set formed by the images "with misjudgment problem" is called an online misjudgment set, and the online misjudgment set is divided into a leak category and an overkill category. The image of the leak category is an image judged to not have a defect image region by the off-line model and re-judged to have the defect image region by the executor. The image of overkill category is an image judged to have a defect image region by the off-line model and re-judged to not have the defect image region by the executor.

The online misjudgment set and the original test set for testing the off-line model are combined into an online test set.

A part of the online misjudgment set forms the initial "retrain set", that is, the retrain set includes a part of members of the online misjudgment set. In some embodiments of the present invention, the online misjudgment set is randomly divided into 5 parts, and then one part is taken as the initial "retrain set". The initial "retrain set" is marked by the executor (the same as the marking procedure shown as FIG. 18 and FIG. 19) and then combined with the original training set for training off-line model to form a current training set.

The online correct set is added to the original data pool according to the real ok image region/uncertain image region/defect image region to form an online data pool, so the online data pool still has the first category set, the second category set and the third category set. The online validation set is formed by respectively taking a proper number (e.g., 100) of images from the first category set of the online data pool and the second category set of the online data pool in a random manner.

In some embodiments of the present invention, the training system takes the current training set as the training set, replaces the original data pool with the online data pool, replaces the validation set with the online validation set, and executes steps S2001-S2007 shown as FIG. 20 to obtain the master model, and the master model is taken as an online candidate master model. The implementation details of steps S2001-S2007 may refer to the description and will not be repeated herein.

Figure 27:
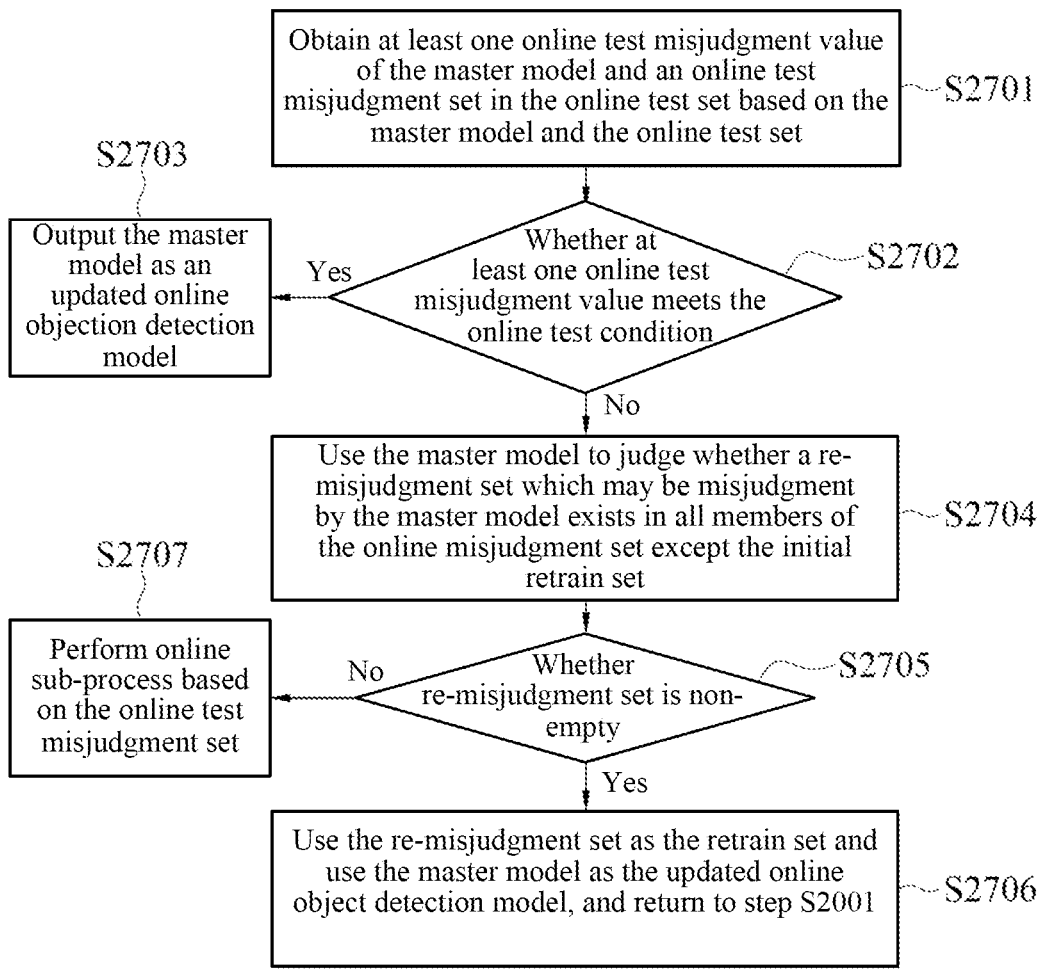
FIG. 27 is an online model training method flowchart according to some embodiments of the present invention.

After the master model is obtained as the online candidate master model, the online candidate master model is subjected to the testing process as the training process of the off-line model. FIG. 27 is an online model training method flowchart according to some embodiments of the present invention. In the embodiments shown as FIG. 27, after the master model is obtained as the online candidate master model (hereinafter referred to as the online candidate master model by the master model), the method further includes step S2701 to step S2707. In step S2701, the processing unit 101 obtains at least one online test misjudgment value of the master model and an online test misjudgment set in the online test set based on the master model and the online test set. In step S2702, the processing unit 101 judges whether the at least one online test misjudgment value meets an online test condition; if the online test misjudgment value meets the online testing condition, step S2703 is executed; and if not, step S2704 is executed. In step S2703, the master model is outputted as an updated online object detection model. In step S2704, the processing unit 101 uses the master model to judge whether a re-misjudgment set which may be misjudgment by the master model exists in all members of the online misjudgment set except the initial retrain set. In step S2705, if the re-misjudgment set is non-empty, step S2706 is executed; and if the re-misjudgment set is an empty set, step S2707 is executed. In step S2706, the processing unit 101 uses the re-misjudgment set as the retrain set and uses the online master model as the updated online object detection model, and then returns to step S2001 to restart. In step S2707, the processing unit 101 executes an online sub-process based on the online test misjudgment set.

The embodiments of the functions executed in steps S2701 to S2707 may refer to the abovementioned related embodiments and will not be repeated here.

Figure 28:
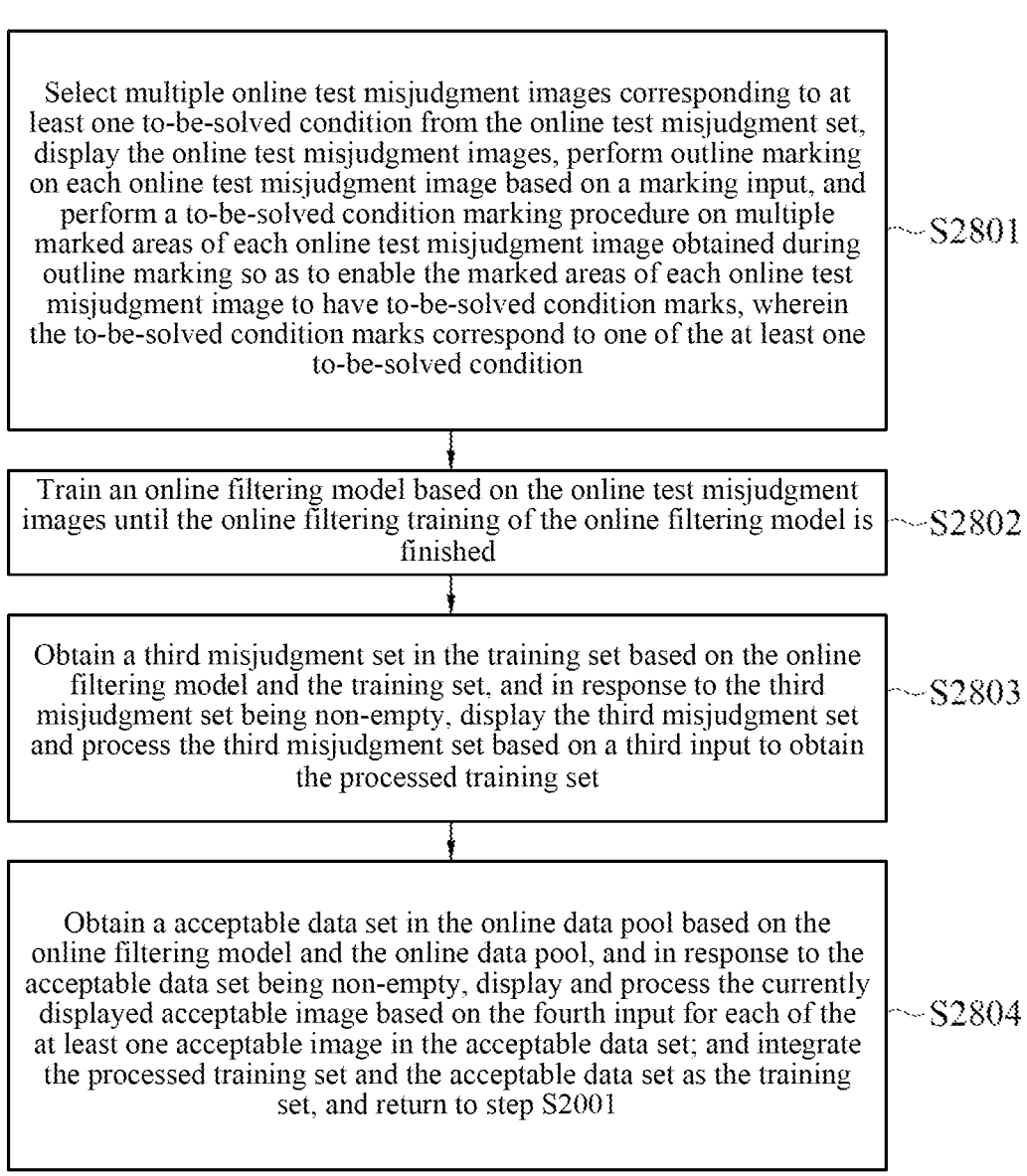
FIG. 28 is an online sub-process flowchart according to some embodiments of the present invention.

FIG. 28 is an online sub-process flowchart according to some embodiments of the present invention. In the embodiments shown as FIG. 28, the online sub-process includes step S2801 to step S2804. In step S2801, the processing unit 101 selects multiple online test misjudgment images corresponding to at least one to-be-solved condition from the online test misjudgment set; and the processing unit 101 displays the online test misjudgment images, performs outline marking on each online test misjudgment image based on a marking input, and performs a to-be-solved condition marking procedure on multiple marked areas of each online test misjudgment image obtained during outline marking so as to enable the marked areas of each online test misjudgment image to have to-be-solved condition marks, wherein the to-be-solved condition marks correspond to one of the at least one to-be-solved condition. In step S2802, the processing unit 101 trains the online filtering model based on online test misjudgment images until an online filtering training of the online filtering model is finished, wherein a structure of the online filtering model is the same as that of the online master model; and at least one detection category of the online filtering model includes at least one to-be-solved condition. In step S2803, the processing unit 101 obtains a third misjudgment set in the online training set based on the online filtering model and the online training set, and displays and processes the third misjudgment set based on the third input in response to the third misjudgment set being non-empty so as to obtain a processed training set. In step S2804, the processing unit 101 obtains the acceptable data set from the online data pool based on the online filtering model and the online data pool, and displays and processes the currently displayed acceptable image for each of at least one acceptable image in the acceptable data set based on the fourth input in response to the acceptable data set being non-empty; and integrate the processed training set and the acceptable data set as the online training set, and go back to step S2001 to restart the training.

Figure 29:
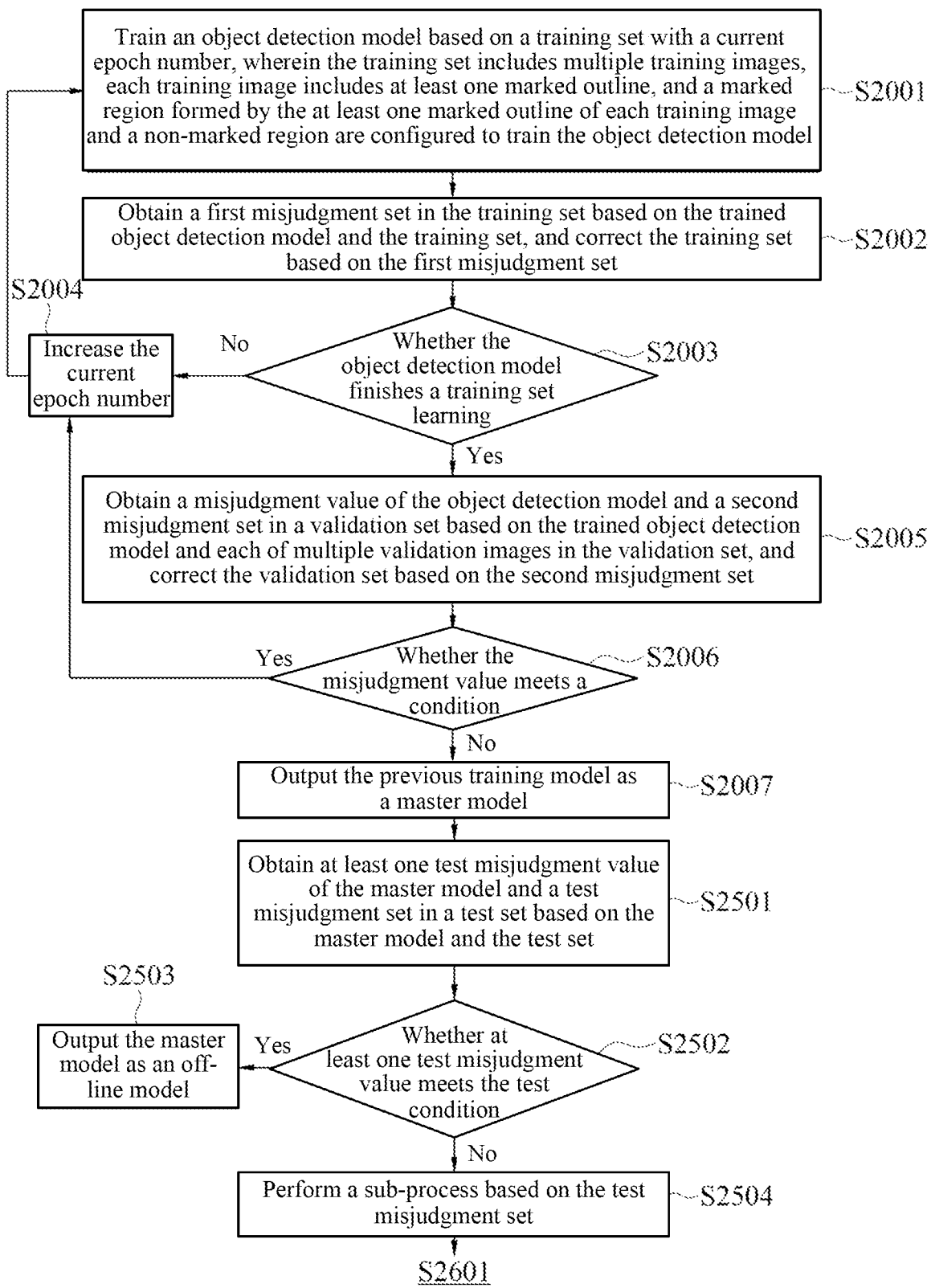
FIG. 29 is a training method flowchart according to an embodiment of the present invention.

FIG. 29 is a training method flowchart according to an embodiment of the present invention. In this embodiment shown as FIG. 29, the steps disclosed previously are integrated to obtain the off-line model. In this embodiment, the processing unit 101 executes steps S2001-S2007 to obtain the master model. After the master model is obtained, the processing unit 101 executes steps S2501-S2504 and S2601-S2604 to obtain the off-line model when the test misjudgment value meets the test condition. According to the above process, steps S2001-S2007 may be repeated for several times before the test misjudgment value meets the test condition. The master model obtained by executing steps S2001-S2007 each time is called a generation of master model, and multiple generations of master models may be generated before the off-line model is obtained.

Figure 30:
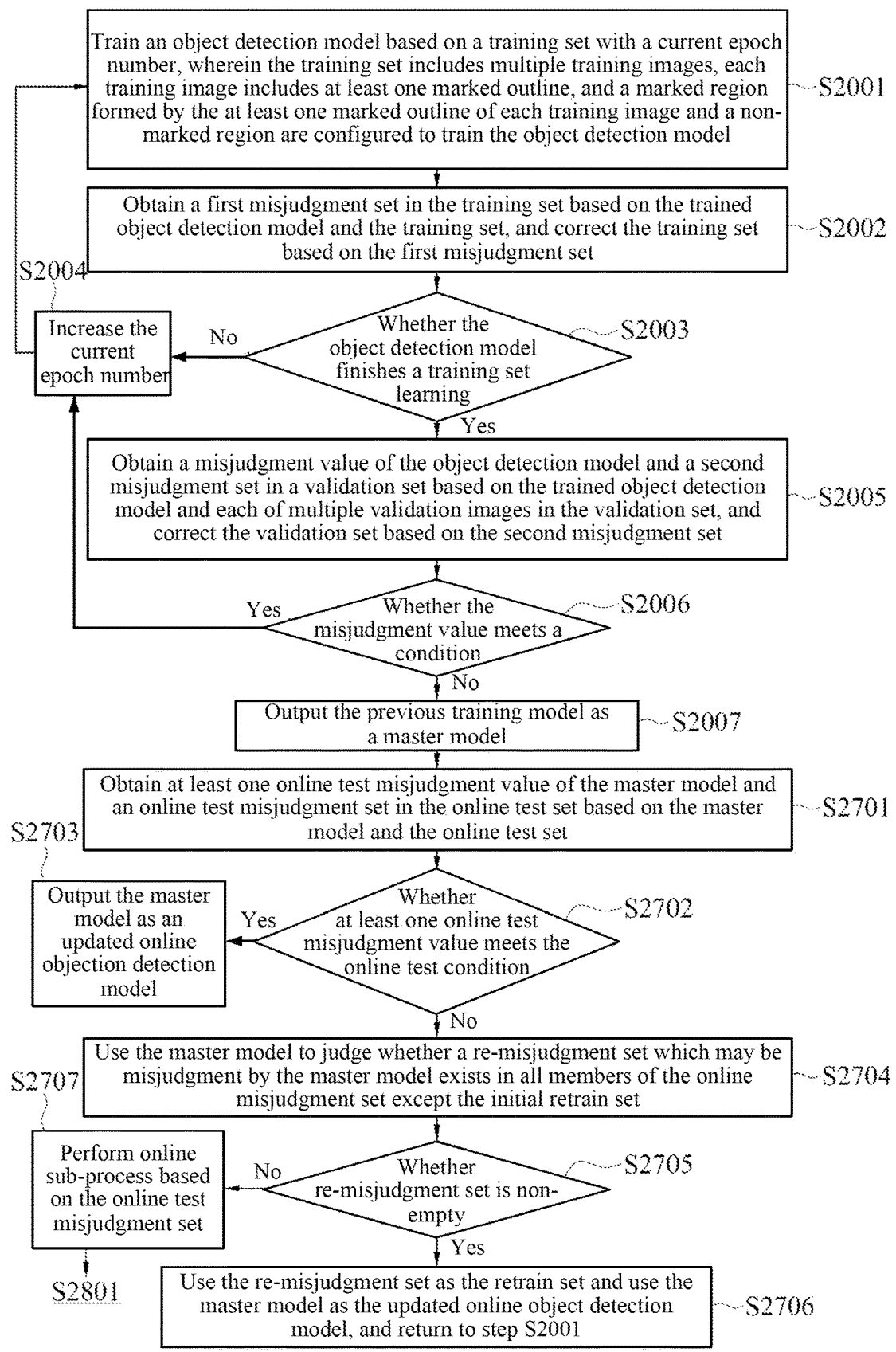
FIG. 30 is an online training method flowchart according to an embodiment of the present invention.

FIG. 30 is an online training method flowchart according to an embodiment of the present invention. In this embodiment shown as FIG. 30, the steps disclosed in the previous are integrated to obtain the updated online object detection model. In this embodiment, the processing unit 101 executes steps S2001-S2007 to obtain the master model. After the master model is obtained, the processing unit 101 executes steps S2701-S2706 and S2801-S2804 to obtain the updated online object detection model under the condition that an online test misjudgment value meets the online test condition.

Referring to FIG. 1 again, the internal memory 102 is a Random-Access Memory (RAM) for example. The non-volatile memory is at least one disk memory for example. Certainly, the electronic device 100 may also include hardware for other functions.

The processing unit 101 may include processors 101-1 to 101-R, wherein R is a positive integer. The processors 101-1 to 101-R may be an integrated circuit wafer having signal processing capabilities. In the implementation process, the methods and steps disclosed in the aforementioned embodiments may be accomplished via a hardware integrated logic circuit or a software instruction in the processors 101-1 to 101-R. The processors 101-1 to 101-R may be a general purpose processor, including a central processing unit (CPU), a tensor processing unit, a digital signal processor (DSP), an application specific integrated circuit (ASIC), a field-programmable gate array (FPGA), a graphics processing unit (GPU), or other programmable logic devices, which may implement or execute the methods and steps disclosed in the aforementioned embodiments.

An embodiment of the previous further provides a computer readable storage medium which stores at least one instruction. When the at least one instruction is executed by the processing unit 101 of the electronic device 100, the processing unit 101 of the electronic device 100 may execute the methods and steps disclosed in the embodiment.

Examples of computer-storage media include, but are not limited to, phase change memories (PRAM), static random access memories (SRAM), dynamic random access memories (DRAM), other types of random access memories (RAM), read-only memories (ROM), electrically erasable programmable read-only memories (EEPROM), flash memory or other internal memory technologies, compact disc read-only memories (CD-ROM), digital versatile discs (DVD) or other optical memories, magnetic tape cassettes, magnetic tape disk memories or other magnetic storage devices or any other non-transmission media, which can be used for storing information that can be accessed by computing devices. According to the definitions herein, the computer readable media do not include transitory media, such as modulated data signals and carriers.

As described above, some embodiments of the present invention provide the training system, the training method, the testing system, the testing method, the data filtering system, the data filtering method, and the computer readable recording medium with the stored program. By correcting the training set, the domain knowledge could be sustainably integrated to improve the quality of the training set. By continuously judging whether the object detection model finishes the training set learning or not, it can be ensured that the model passes through the underfitting stage. In addition, by judging whether the object detection model is overfitting or not through the validation set, the object detection model in the optimal training state could be obtained before the object detection model is subjected to overfitting to serve as the master model. The test set is used for verifying whether an optimal model trained by using the current training set meets the application requirement; and when the "optimal model trained by using the current training set" does not meet the application requirement, a sub-process will provide a standardization method of "correcting training set mark" and "newly adding training set data" to correct a relatively proper training set. Then, the training set can be put into an off-line/online training process again to retrain or correct a model which better meets the data requirement of the test set. By searching for the acceptable data set, the training set can be automatically analyzed to find out misjudgment reasons in the test set. It also utilizes the program algorithm process with domain knowledge to automate the correction of existing training set marking problems and the introduction of missing new data to obtain the data set for the next training.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A training system, comprising at least one processing unit and an object detection model, the at least one processing unit being configured to execute the following steps:
   (a) before the object detection model finishes a training set learning, repeatedly executing the following steps: training the object detection model based on a training set with a current epoch number, wherein the training set comprise a plurality of training images, each training image comprise at least one marked outline, and a marked region formed by the at least one marked outline of each training image and a non-marked region are configured to train the object detection model; obtaining a first misjudgment set in the training set based on the trained object detection model and the training set; correcting the training set based on the first misjudgment set; and increasing the current epoch number; and
   (b) obtaining a misjudgment value of the object detection model and a second misjudgment set in a validation set based on the trained object detection model and each of a plurality of validation images in the validation set; correcting the validation set based on the second misjudgment set; and in response to the misjudgment value meeting a condition, increasing the current epoch number and executing steps (a)-(b), and in response to the misjudgment value not meeting the condition, outputting a previous training model as a master model.

2. The training system according to claim 1, wherein the training images are selected from a first category set in a data pool; the validation images are selected from the first category set in the data pool and a second category set in the data pool; the first category set comprises a plurality of first images belonging to a first category; the second category set comprises a plurality of second images belonging to a second category, wherein an image belonging to the first category represents that the image is judged to comprise at least one defect image region belonging to one of a plurality of standard defect categories, and an image belonging to the second category represents that the image is judged to not comprise an image region belonging to one of the standard defect categories, and also not comprise an image region which is unable to be judged whether to belong to one of the standard defect categories; and the at least one defect image region of each of the training images is marked with an outline.

3. The training system according to claim 2, wherein the data pool comprises a third category set; the third category set comprises a plurality of third images; and each of the third images does not comprise the image region belonging to one of the standard defect categories but comprises the image region which is unable to be judged whether to belong to one of the standard defect categories.

4. The training system according to claim 2, wherein the standard defect categories comprise a foreign matter category and a scratch category.

5. The training system according to claim 2, wherein step (a) comprises the following steps for judging whether the object detection model finishes the training set learning and obtains the first misjudgment set in the training set:
   inputting each training image into the trained object detection model, and calculating a missing number wherein the missing number is the number of elements in the missing set in the plurality of training images, and each element in the missing set contains a defect image region undetected by the trained objection detection model of the at least one defect image region;
   judging that the object detection model finishes the training set learning in response to the number of missing being zero, and setting the first misjudgment set as an empty set; and
   judging that the object detection model does not finish the training set learning in response to the number of missing being non-zero, and setting at least one misjudgment training image of the training images having the members of the missing set as the first misjudgment set.

6. The training system according to claim 2, wherein step (a) comprises the following steps for judging whether the object detection model finishes the training set learning and obtains the first misjudgment set in the training set:
   inputting each training image into the trained object detection model, calculating a missing number wherein the missing number is the number of elements in the missing set in the plurality of training images, and each element in the missing set contains a defect image region undetected by the trained object detection model of the at least one defect image region, and calculating a wrong number wherein the wrong number is the number of elements in the wrong set in the plurality of training images, and each element in the wrong set contains a region unmarked as belonging to one of the standard defect categories in all the training images but detected by the trained object detection model;
   judging that the object detection model finishes training set learning in response to a sum of the missing number and the wrong number being zero, and setting the first misjudgment set as an empty set; and
   judging that the object detection model does not finish the training set learning in response to the sum of the missing number and the wrong number being non-zero, and setting at least one misjudgment training image of the plurality of training images having the members of the missing set or of the wrong set as the first misjudgment set.

7. The training system according to claim 2, wherein step (b) comprises the following steps for obtaining the misjudgment value of the object detection model and the second misjudgment set in the validation set based on the trained object detection model and the validation set:
   inputting each validation image into the trained object detection model, calculating a leak number wherein the leak number is the number of elements in a leak set in the validation images, and calculating an overkill number wherein the overkill number is the number of elements in an overkill set in the validation images, the leak set being formed by images which belong to the first category set in the validation images and are not detected to comprise the defect image regions belonging to the standard defect categories by the trained object detection model, and the overkill set being formed by images which belong to the second category set in the validation images and are detected to comprise the defect image regions belonging to the standard defect categories by the trained object detection model; and
   setting the misjudgment value as a sum of the leak number and the overkill number; setting the second misjudgment set as an empty set in response to the sum of the leak number and the overkill number being zero; and setting at least one misjudgment validation image belonging to the leak set or the overkill set in the validation images as the second misjudgment set in response to the sum of the leak number and the overkill number being not zero.

8. The training system according to claim 2, wherein the at least one processing unit is configured to execute the following steps:
obtaining a test misjudgment value of the master model and a test misjudgment set in a test set based on the master model and the test set; outputting the master model as an off-line model in response to the test misjudgment value meeting a test condition; and performing a sub-process based on the test misjudgment set in response to the test misjudgment value not meeting the test condition, wherein the test set comprises a plurality of test images, and the test images comprise a plurality of first test images belonging to the first category and a plurality of second test images belonging to the second category.

9. The training system according to claim 8, wherein the at least one processing unit is configured to execute the following steps to execute the sub-process:
(d1) selecting a plurality of test misjudgment images corresponding to at least one to-be-solved condition from the test misjudgment set; and displaying the test misjudgment images, performing outline marking on each test misjudgment image based on a marking input, and performing a to-be-solved condition marking procedure on a plurality of marked areas of each test misjudgment image obtained during outline marking so as to enable the marked areas of each test misjudgment image to have a to-be-solved condition mark, wherein the to-be-solved condition mark corresponds to one of the at least one to-be-solved condition;
(d2) training a filtering model based on the test misjudgment images until a filtering training of the filtering model is finished, wherein a structure of the filtering model is the same as that of the master model, and at least one detection category of the filtering model comprising the at least one to-be-solved condition;
(d3) obtaining a third misjudgment set in the training set based on the filtering model and the training set, and in response to the third misjudgment set being non-empty, displaying and processing the third misjudgment set based on a third input to obtain a processed training set; and
(d4) obtaining an acceptable data set in the data pool based on the filtering model and the data pool, and in response to the acceptable data set being non-empty, displaying and processing a currently displayed acceptable image based on a fourth input for each of at least one acceptable image in the acceptable data set; and integrating the training set processed and the acceptable data set as the training set, and executing steps (a)-(b).

10. The training system according to claim 9, wherein step (d4) comprises: displaying at least one detection area detected by the filtering model for each of the at least one acceptable image in the acceptable data set, and performing a defect category marking procedure on the at least one detection area based on the fourth input so that the at least one detection area of each of the at least one acceptable image has a defect category mark, wherein the defect category mark corresponds to one of a plurality of defect categories, and the defect categories comprise the plurality of standard defect categories and a plurality of special defect categories.

11. The training system according to claim 9, wherein the at least one to-be-solved condition comprises a leak condition and an overkill condition; the leak condition refers to a condition that an image belongs to the first category set in the test images and is not detected to comprise the defect image region belonging to the standard defect categories by the master model; and the overkill condition refers to a condition that an image belongs to the second category set in the test images and is detected to comprise the defect image region belonging to the standard defect categories by the master model.

12. The training system according to claim 1, wherein the training system comprises a user interface; and step (a) comprises the following steps:
in response to the first misjudgment set being non-empty, executing the following steps:
displaying at least one misjudgment set image in the first misjudgment set through the user interface; and
receiving at least one correcting signal corresponding to the at least one misjudgment set image through the user interface, and correcting the training set based on the correcting signal.

13. The training system according to claim 1, comprising a user interface, wherein step (b) comprises the following steps:
in response to the second misjudgment set being non-empty, executing the following steps:
displaying at least one misjudgment set image in the second misjudgment set through the user interface; and
receiving at least one second correcting signal corresponding to the at least one misjudgment set image through the user interface, and correcting the validation set based on the at least one second correcting signal.

14. The training system according to claim 1, wherein the condition is that the misjudgment value is not equal to zero and the misjudgment value is smaller than or equal to a previous misjudgment value; and the object detection model is an instance segmentation model.

15. The training system according to claim 1, wherein the training set comprises an original training set and a retrain set; the validation set is selected from an online data pool; the online data pool comprises an original data pool and an online correct set; the retrain set comprises a part of online misjudgment set, wherein the online correct set is formed by a plurality of correctly judged images correctly judged by the initial object detection model, and the online misjudgment set is formed by a plurality of incorrectly judged images incorrectly judged by the initial object detection model.

16. The training system according to claim 15, wherein the at least one processing unit is configured to execute the following steps:
obtaining an online test misjudgment value of the master model and an online test misjudgment set in an online test set based on the master model and the online test set; outputting the master model as an updated online object detection model in response to the online test misjudgment value meeting an online test condition; using the master model to judge whether a re-misjudgment set which may be misjudgment by the master model exists in all members of the online misjudgment set except the initial retrain set in response to the online test misjudgment value not meeting the online test condition; using the re-misjudgment set as the retrain set and using the master model as the updated object detection model to execute steps (a)-(b) in response to the re-misjudgment set being non-empty; and performing an online sub-process based on the online test misjudgment set in response to the re-misjudgment set being an empty set, wherein the online test set comprises all members of an original test set and the online misjudgment set.

17. The training system according to claim 16, wherein the at least one processing unit is configured to execute the following steps to execute the online sub-process:
selecting a plurality of online test misjudgment images corresponding to at least one to-be-solved condition from the online test misjudgment set; displaying the online test misjudgment images, performing outline marking on each online test misjudgment image based on a marking input, and performing a to-be-solved condition marking procedure on a plurality of marked areas of each online test misjudgment image obtained during outline marking so as to enable the marked areas of each online test misjudgment image to have a to-be-solved condition mark, wherein the to-be-solved condition mark corresponds to one of the at least one to-be-solved condition;
training an online filtering model based on the online test misjudgment images until an online filtering training of the online filtering model is finished, wherein a structure of the online filtering model is the same as that of the master model, and at least one detection category of the online filtering model comprises the at least one to-be-solved condition;
obtaining a third misjudgment set in the training set based on the online filtering model and the training set, and in response to the third misjudgment set being non-empty, displaying and processing the third misjudgment set based on a third input; and
obtaining an acceptable data set in the online data pool based on the online filtering model and the online data pool, and in response to the acceptable data set being non-empty, displaying and processing the currently displayed acceptable image based on a fourth input for each of the at least one acceptable image in the acceptable data set; and integrating a processed third misjudgment set and the acceptable data set as the training set, and executing steps (a)-(b).

18. A training method, suitable for training an object detection model and being executed by at least one processing unit, comprising:
(a) before the object detection model finishes a training set learning, repeatedly executing the following steps: training the object detection model based on a training set with a current epoch number, wherein the training set comprises a plurality of training images, each training image comprises at least one marked outline, and a marked region formed by the at least one marked outline of each training image and a non-marked region are configured to train the object detection model; obtaining a first misjudgment set in the training set based on the trained object detection model and the training set; correcting the training set based on the first misjudgment set; and increasing the current epoch number; and
(b) obtaining a misjudgment value of the object detection model and a second misjudgment set in a validation set based on the trained object detection model and each of a plurality of validation images in the validation set; correcting the validation set based on the second misjudgment set; and in response to the misjudgment value meeting a condition, increasing the current epoch number and executing steps (a)-(b), and in response to the misjudgment value not meeting the condition, outputting a previous training model as a master model.

19. The training method according to claim 18, wherein the training images are selected from a first category set in a data pool; the validation images are selected from the first category set in the data pool and a second category set in the data pool; the first category set comprises a plurality of first images belonging to a first category; the second category set comprises a plurality of second images belonging to a second category, wherein an image belonging to the first category represents that the image is judged to comprise at least one defect image region belonging to one of a plurality of standard defect categories, and an image belonging to the second category represents that the image is judged to not comprise an image region belonging to one of the standard defect categories, and also not comprise an image region which is unable to be judged whether to belong to one of the standard defect categories; and the at least one defect image region of each of the training images is marked with an outline.

20. The training method according to claim 19, wherein the data pool comprises a third category set; the third category set comprises a plurality of third images; and each of the third images does not comprise the image region belonging to one of the standard defect categories but comprises the image region which is unable to be judged whether to belong to one of the standard defect categories.

21. The training method according to claim 19, wherein the standard defect categories comprise a foreign matter category and a scratch category.

22. The training method according to claim 19, wherein step (a) comprises the following steps for judging whether the object detection model finishes the training set learning and obtains the first misjudgment set in the training set:
inputting each training image into the trained object detection model, and calculating a missing number wherein the missing number is the number of elements in the missing set in the plurality of training images, and each element in the missing set contains a defect image region undetected by the trained object detection model of the at least one defect image region;
judging that the object detection model finishes the training set learning in response to the number of missing being zero, and setting the first misjudgment set as an empty set; and
judging that the object detection model does not finish the training set learning in response to the number of missing being non-zero, and setting at least one misjudgment training of the plurality of training images having the members of the missing set as the first misjudgment set.

23. The training method according to claim 19, wherein step (a) comprises the following steps for judging whether the object detection model finishes the training set learning and obtains the first misjudgment set in the training set:
inputting each training image into the trained object detection model, calculating a missing number wherein the missing number is the number of elements in the missing set in the plurality of training images, and each element in the missing set contains a defect image region undetected by the trained object detection model of the at least one defect image region, and calculating a wrong number wherein the wrong number is the number of elements in the wrong set in the plurality of training images, and each element in the missing set contains a defect image region unmarked as belonging to one of the standard defect categories in all the training images but detected by the trained object detection model;

judging that the object detection model finishes training set learning in response to a sum of the missing number and the wrong number being zero, and setting the first misjudgment set as an empty set; and judging that the object detection model does not finish the training set learning in response to the sum of the missing number and the wrong number being non-zero, and setting at least one misjudgment training image of the plurality of training images having the members of the missing set or of the wrong set as the first misjudgment set.

24. The training method according to claim 19, wherein step (b) comprises the following steps for obtaining the misjudgment value of the object detection model and the second misjudgment set in the validation set based on the trained object detection model and the validation set:

inputting each validation image into the trained object detection model, calculating a leak number wherein the leak number is the number of elements in a leak set in the validation images, and calculating an overkill number wherein the overkill number is the number of elements in an overkill set in the validation images, wherein the leak set is formed by images which belong to the first category set in the validation images and are not detected to comprise the defect image regions belonging to the standard defect categories by the trained object detection model, and the overkill set is formed by images which belong to the second category set in the validation images and are detected to comprise the defect image regions belonging to the standard defect categories by the trained object detection model; and setting the misjudgment value as a sum of the leak number and the overkill number; setting the second misjudgment set as an empty set in response to the sum of the leak number and the overkill number being zero; and setting at least one misjudgment validation image belonging to the leak set or the overkill set in the validation images as the second misjudgment set in response to the sum of the leak number and the overkill number being not zero.

25. The training method according to claim 19, comprising:

obtaining a test misjudgment value of the master model and a test misjudgment set in a test set based on the master model and the test set; outputting the master model as an off-line model in response to the test misjudgment value meeting a test condition; and performing a sub-process based on the test misjudgment set in response to the test misjudgment value not meeting the test condition, wherein the test set comprises a plurality of test images, and the test images comprise a plurality of first test images belonging to the first category and a plurality of second test images belonging to the second category.

26. The training method according to claim 25, wherein the sub-process comprises:

(d1) selecting a plurality of test misjudgment images corresponding to at least one to-be-solved condition from the test misjudgment set; and displaying the test misjudgment images, performing outline marking on each test misjudgment image based on a marking input, and performing a to-be-solved condition marking procedure on a plurality of marked areas of each test misjudgment image obtained during outline marking so as to enable the marked areas of each test misjudgment image to have a to-be-solved condition mark, wherein the to-be-solved condition mark corresponds to one of the at least one to-be-solved condition;

(d2) training a filtering model based on the test misjudgment images until a filtering training of the filtering model is finished, wherein a structure of the filtering model is the same as that of the master model, and at least one detection category of the filtering model comprises the at least one to-be-solved condition;

(d3) obtaining a third misjudgment set in the training set based on the filtering model and the training set, and in response to the third misjudgment set being non-empty, displaying and processing the third misjudgment set based on a third input to obtain a processed training set; and (d4) obtaining an acceptable data set in the data pool based on the filtering model and the data pool, and in response to the acceptable data set being non-empty, displaying and processing a currently displayed acceptable image based on a fourth input for each of at least one acceptable image in the acceptable data set; and integrating the training set processed and the acceptable data set as the training set, and executing steps (a)-(b).

27. The training method according to claim 26, wherein step (d4) comprises: displaying at least one detection area detected by the filtering model for each of the at least one acceptable image in the acceptable data set, and performing a defect category marking procedure on the at least one detection area based on the fourth input so that the at least one detection area of each of the at least one acceptable image has a defect category mark, wherein the defect category mark corresponds to one of a plurality of defect categories, and the defect categories comprises the plurality of standard defect categories and a plurality of special defect categories.

28. The training method according to claim 26, wherein the at least one to-be-solved condition comprises a leak condition and an overkill condition, wherein the leak condition refers to a condition that an image belongs to the first category set in the test images and is not detected to comprise the defect image region belonging to the standard defect categories by the master model, and the overkill condition refers to a condition that an image belongs to the second category set in the test images and is detected to comprise the defect image region belonging to the standard defect categories by the master model.

29. The training method according to claim 18, wherein step (a) comprises the following steps:

in response to the first misjudgment set being non-empty, executing the following steps:

displaying at least one misjudgment set image in the first misjudgment set through a user interface; and receiving at least one correcting signal corresponding to the at least one misjudgment set image through the user interface, and correcting the training set based on the correcting signal.

30. The training method according to claim 18, wherein step (b) comprises the following steps:

in response to the second misjudgment set being non-empty, executing the following steps:

displaying at least one misjudgment set image in the second misjudgment set through a user interface; and receiving at least one second correcting signal corresponding to the at least one misjudgment set image through the user interface, and correcting the validation set based on the at least one second correcting signal.

31. The training method according to claim 18, wherein the condition is that the misjudgment value is not equal to zero and the misjudgment value is smaller than or equal to a previous misjudgment value; and the object detection model is an instance segmentation model.

32. The training method according to claim 18, wherein the training set comprises an original training set and a retrain set; the validation set is selected from an online data pool; the online data pool comprises an original data pool and an online correct set, and the retrain set comprises a part of online misjudgment set, wherein the online correct set is formed by a plurality of correctly judged images correctly judged by the initial object detection model, and the online misjudgment set is formed by a plurality of incorrectly judged images incorrectly judged by the initial object detection model.

33. The training method according to claim 32, comprising:
obtaining an online test misjudgment value of the master model and an online test misjudgment set in an online test set based on the master model and the online test set; outputting the master model as an updated online object detection model in response to the online test misjudgment value meeting an online test condition; using the master model to judge whether a re-misjudgment set which may be misjudgment by the master model exists in all members of the online misjudgment set except the initial retrain set in response to the online test misjudgment value not meeting the online test condition; using the re-misjudgment set as the retrain set and using the master model as the updated object detection model to execute steps (a)-(b) in response to the re-misjudgment set being non-empty; and performing an online sub-process based on the online test misjudgment set in response to the re-misjudgment set being an empty set; wherein the online test set comprises all members of an original test set and the online misjudgment set.

34. The training method according to claim 33, wherein the online sub-process comprises:
selecting a plurality of online test misjudgment images corresponding to at least one to-be-solved condition from the online test misjudgment set; displaying the online test misjudgment images, performing outline marking on each online test misjudgment image based on a marking input, and performing a to-be-solved condition marking procedure on a plurality of marked areas of each online test misjudgment image obtained during outline marking so as to enable the marked areas of each online test misjudgment image to have a to-be-solved condition mark, wherein the to-be-solved condition mark corresponds to one of the at least one to-be-solved condition;
training an online filtering model based on the online test misjudgment images until an online filtering training of the online filtering model is finished, wherein a structure of the online filtering model is the same as that of the master model, and at least one detection category of the online filtering model comprises the at least one to-be-solved condition;
obtaining a third misjudgment set in the training set based on the online filtering model and the training set, and in response to the third misjudgment set being non-empty, displaying and processing the third misjudgment set based on a third input; and
obtaining an acceptable data set in the online data pool based on the online filtering model and the online data pool, and in response to the acceptable data set being non-empty, displaying and processing the currently displayed acceptable image based on a fourth input for each of the at least one acceptable image in the acceptable data set; and integrating a processed third misjudgment set and the acceptable data set as the training set, and executing steps (a)-(b).

35. A computer readable recording medium with a stored program, implementing the method according to claim 18 after at least one processor loads the stored program and executes the stored program.

36. A testing system, comprising:
at least one processing unit, configured to execute the following steps:
obtaining a test misjudgment value of a master model and a test misjudgment set in a test set based on the master model and the test set; outputting the master model as an off-line model in response to the test misjudgment value meeting a test condition; and outputting the master model and the test misjudgment set in response to the test misjudgment value not meeting the test condition, wherein the test set comprises a plurality of test images, and the test images comprise a plurality of first test images belonging to a first category and a plurality of second test images belonging to a second category, wherein an image belonging to the first category represents that the image is judged to comprise at least one defect image region belonging to one of a plurality of defect categories, and an image belonging to the second category represents that the image is judged to not comprise an image region belonging to one of the defect categories.

37. A testing method, executed by at least one processing unit, comprising:
obtaining a test misjudgment value of a master model and a test misjudgment set in a test set based on the master model and the test set; outputting the master model as an off-line model in response to the test misjudgment value meeting a test condition; and outputting the master model and the test misjudgment set in response to the test misjudgment value not meeting the test condition, wherein the test set comprises a plurality of test images, and the test images comprise a plurality of first test images belonging to a first category and a plurality of second test images belonging to a second category, wherein an image belonging to the first category represents that the image is judged to comprise at least one defect image region belonging to one of a plurality of defect categories, and an image belonging to the second category represents that the image is judged to not comprise an image region belonging to one of the defect categories.

38. A computer readable recording medium with a stored program, implementing the method according to claim 37 after at least one processor loads the stored program and executes the stored program.

39. A data filtering system, comprising:
at least one processing unit, configured to execute the following steps:
receiving a master model, a data pool, a training set, and a test misjudgment set;
selecting a plurality of test misjudgment images corresponding to at least one to-be-solved condition from the test misjudgment set; displaying the test misjudgment images, performing outline marking on each test misjudgment image based on a marking input, and performing a to-be-solved condition marking procedure on a plurality of marked areas of each test misjudgment image obtained during outline marking so as to enable the marked areas of each test misjudgment image to have a to-be-solved condition mark, wherein the to-be-solved condition mark corresponds to one of the at least one to-be-solved condition;

training a filtering model based on the test misjudgment images until a filtering training of the filtering model is finished, wherein a structure of the filtering model is the same as that of the master model, and at least one detection category of the filtering model comprising the at least one to-be-solved condition;

obtaining a misjudgment set in the training set based on the filtering model and the training set, and in response to the misjudgment set being non-empty, displaying and processing the misjudgment set based on a first input to obtain a processed training set; and obtaining an acceptable data set in the data pool based on the filtering model and the data pool, and in response to the acceptable data set being non-empty, displaying and processing a currently displayed acceptable image based on a second input for each of at least one acceptable image in the acceptable data set; and integrating the training set processed and the acceptable data set as the training set.

40. A data filtering method, executed by at least one processing unit, comprising:

receiving a master model, a data pool, a training set, and a test misjudgment set;

selecting a plurality of test misjudgment images corresponding to at least one to-be-solved condition from the test misjudgment set; displaying the test misjudgment images, performing outline marking on each test misjudgment image based on a marking input, and performing a to-be-solved condition marking procedure on a plurality of marked areas of each test misjudgment image obtained during outline marking so as to enable the marked areas of each test misjudgment image to have a to-be-solved condition mark, wherein the to-be-solved condition mark corresponds to one of the at least one to-be-solved condition;

training a filtering model based on the test misjudgment images until a filtering training of the filtering model is finished, wherein a structure of the filtering model is the same as that of the master model, and at least one detection category of the filtering model comprising the at least one to-be-solved condition;

obtaining a misjudgment set in the training set based on the filtering model and the training set, and in response to the misjudgment set being non-empty, displaying and processing the misjudgment set based on a first input to obtain a processed training set; and obtaining an acceptable data set in the data pool based on the filtering model and the data pool, and in response to the acceptable data set being non-empty, displaying and processing a currently displayed acceptable image based on a second input for each of at least one acceptable image in the acceptable data set; and integrating the training set processed and the acceptable data set as the training set.

41. A computer readable recording medium with a stored program, implementing the method according to claim 40 after at least one processor loads the stored program and executes the stored program.

\* \* \* \* \*